(12) United States Patent
Hama et al.

(10) Patent No.: US 11,697,234 B2
(45) Date of Patent: Jul. 11, 2023

(54) DECORATIVE SHEET AND METHOD FOR MANUFACTURING MOLDED ARTICLE

(71) Applicant: NISSHA CO., LTD., Kyoto (JP)

(72) Inventors: Daichi Hama, Kyoto (JP); Chuzo Taniguchi, Kyoto (JP); Toshitsugu Fujimura, Kyoto (JP); Masato Kurahashi, Kyoto (JP)

(73) Assignee: NISSHA CO., LTD., Kyoto (JP)

( * ) Notice: Subject to any disclaimer, the term of this patent is extended or adjusted under 35 U.S.C. 154(b) by 0 days.

(21) Appl. No.: 17/904,694

(22) PCT Filed: Aug. 3, 2020

(86) PCT No.: PCT/JP2020/029686
§ 371 (c)(1),
(2) Date: Aug. 19, 2022

(87) PCT Pub. No.: WO2021/229834
PCT Pub. Date: Nov. 18, 2021

(65) Prior Publication Data
US 2023/0074600 A1    Mar. 9, 2023

(30) Foreign Application Priority Data

May 12, 2020   (JP) .................................. 2020-083738

(51) Int. Cl.
*B29C 45/14* (2006.01)
*B32B 7/12* (2006.01)
(Continued)

(52) U.S. Cl.
CPC .......... *B29C 45/14688* (2013.01); *B32B 7/12* (2013.01); *B41M 5/502* (2013.01); *B29C 2045/14696* (2013.01); *B29C 2045/14704* (2013.01); *B32B 23/08* (2013.01); *B32B 27/08* (2013.01); *B32B 27/18* (2013.01); *B32B 27/302* (2013.01); *B32B 27/308* (2013.01); *B32B 27/32* (2013.01); *B32B 27/34* (2013.01);
(Continued)

(58) Field of Classification Search
CPC ................................................ B32B 2307/416
See application file for complete search history.

(56) References Cited

FOREIGN PATENT DOCUMENTS

| JP | 2003103709 A | 4/2003 |
|----|---------------|--------|
| JP | 5725581 B1 | 5/2015 |

(Continued)

*Primary Examiner* — Ian A Rummel
(74) *Attorney, Agent, or Firm* — Alleman Hall Creasman & Tuttle LLP

(57) ABSTRACT

Provided is a decorative sheet in which a graphic is less deteriorated even after injection molding. First and second graphic layers contain a plurality of interference pigments that emit respective interference lights having respective colors in a first direction in first and second binders to exhibit first and second mixed colors. An optical functional layer changes a reflectance property of light. The first and second graphic layers represent a graphic visually recognizable from a front surface of a decorative sheet and allow visually recognizing an image displayed on a back surface from the front surface. The optical functional layer increases at least one of ratios of an amount of visible light representing the graphic and an amount of visible light representing the image that transmits through the first and second graphic layers to an amount of visible light reflected by and visible on the front surface.

7 Claims, 21 Drawing Sheets

(51) Int. Cl.
*B41M 5/50* (2006.01)
*B32B 23/08* (2006.01)
*B32B 27/08* (2006.01)
*B32B 27/18* (2006.01)
*B32B 27/30* (2006.01)
*B32B 27/32* (2006.01)
*B32B 27/34* (2006.01)
*B32B 27/36* (2006.01)
*B32B 27/40* (2006.01)

(52) U.S. Cl.
CPC ............. *B32B 27/36* (2013.01); *B32B 27/365* (2013.01); *B32B 27/40* (2013.01); *B32B 2255/10* (2013.01); *B32B 2255/205* (2013.01); *B32B 2255/26* (2013.01); *B32B 2255/28* (2013.01); *B32B 2307/412* (2013.01); *B32B 2307/416* (2013.01); *B32B 2457/20* (2013.01)

(56) References Cited

FOREIGN PATENT DOCUMENTS

| | | | |
|---|---|---|---|
| JP | 2015120304 A | 7/2015 |
| JP | 2017159510 A | 9/2017 |
| WO | 9531737 A1 | 11/1995 |
| WO | 2018110422 A1 | 6/2018 |
| WO | 2019146494 A1 | 8/2019 |

DECORATIVE SHEET AND METHOD FOR MANUFACTURING MOLDED ARTICLE

TECHNICAL FIELD

The present invention relates to a decorative sheet and a method for manufacturing a molded article, and particularly relates to a decorative sheet used for simultaneous molding and decoration and a method for manufacturing a molded article that performs simultaneous molding decoration.

BACKGROUND ART

In related art, for example, as described in Patent Document 1, there has been known a printed matter using a first color binder containing an interference pigment that develops red, a second color binder containing an interference pigment that develops green, and a third color binder containing an interference pigment that develops blue.

A first color pattern layer is printed with the first color binder having the large number of dots, a second color pattern layer is printed with the second color binder having the large number of dots, and a third color pattern layer is printed with the third color binder having the large number of dots to manufacture the printed matter described in Patent Document 1.

In the printed matter manufactured in this manner, red interference light reflected by the red interference pigment, green interference light reflected by the green interference pigment, and blue interference light reflected by the blue interference pigment are subjected to additive color mixing, and thus a wide variety of color expressions are possible.

In addition, Patent Document 1 discloses a printed matter that allows visual recognition of different images using transmitted lights of process inks in four colors, cyan (C), magenta (M), yellow (Y), and black (K), in addition to the first color binder, the second color binder, and the third color binder described above.

CITATION LIST

Patent Literature

Patent Document 1: JP5725581B

SUMMARY OF INVENTION

Technical Problem

In the printed matter described in Patent Document 1, the wide variety of color expressions have been made by a degree of overlap of the dotted first color binder, second color binder, and third color binder. When a graphic is formed on a decorative sheet used for simultaneous molding and decoration by the printing method of Patent Document 1, due to heat and pressure during injection molding in simultaneous molding and decoration, the degree of overlap of the binders changes, thus changing the graphic between before the molding and after the molding.

An object of the present invention is to provide a decorative sheet in which a graphic that decorates a molded body is less deteriorated even when heat and pressure are applied during injection molding.

Solution to Problem

Some aspects will be described below as means to solve the problems. These aspects can be combined arbitrarily as necessary.

A decorative sheet according to one aspect of the present invention is a decorative sheet having a back surface and a front surface used to decorate a molded article including a light-transmissive molded body having a three-dimensional shape or a two-dimensional shape. The back surface is bonded to the molded body. The front surface faces a side opposite to the molded body. The decorative sheet includes a base film, a first graphic layer, a second graphic layer, an optical functional layer, and an adhesive layer. The base film has a first main surface and a second main surface and transmits visible light. The first graphic layer is provided on a side of the second main surface of the base film. The first graphic layer contains a plurality of kinds of interference pigments in a first group that emit respective interference lights having a plurality of colors different from one another in a first direction heading from the back surface to the front surface of the decorative sheet in a first binder that transmits visible light to exhibit a first mixed color. The second graphic layer is provided on a side of the second main surface of the base film. The second graphic layer contains a plurality of kinds of interference pigments in a second group that emit respective interference lights having a plurality of colors different from one another in the first direction in a second binder that transmits visible light to exhibit a second mixed color different from the first mixed color. The optical functional layer is provided closer to the front surface of the decorative sheet than the first graphic layer and the second graphic layer. The optical functional layer has an optical function that changes a reflectance property of light and transmits visible light. The adhesive layer is provided on the back surface of the decorative sheet. The adhesive layer transmits visible light and is bondable to the molded body. The first graphic layer and the second graphic layer are configured such that a first planer shape of the first graphic layer and a second planer shape of the second graphic layer are combined to represent a graphic visually recognizable from a side of the front surface and the interference pigments contained in the first group, the interference pigments contained in the second group, the first binder, and the second binder transmit incident light traveling in the first direction to allow visually recognizing an image displayed on a side of the back surface of the decorative sheet from the side of the front surface of the decorative sheet. The optical functional layer is configured to have a reflectance property. The reflectance property increases a ratio of at least one of an amount of visible light representing the graphic and an amount of visible light representing the image and passing through the first graphic layer and the second graphic layer with respect to an amount of visible light reflected by and visible on the front surface of the decorative sheet.

In the first graphic layer and the second graphic layer of the decorative sheet according to one aspect, the plurality of kinds of interference pigments are mixed in the respective first group and second group. Thus, the first mixed color and the second mixed color produced by mixing the interference pigments are less likely to change due to heat and pressure during injection molding. This allows suppressing change in the graphic with the first mixed color and the second mixed color. In addition, since the amount of visible light passing through the first main surface of the base film from the first graphic layer and the second graphic layer to be visually recognized becomes larger than an amount of noise, such as reflected light at the first main surface, due to the optical functional layer, the graphic is clear and a quality of the graphic can be improved.

The optical functional layer of the above-described decorative sheet may have a hardness higher than a hardness of the base film. The first graphic layer and the second graphic layer are less likely to be scratched, thereby ensuring suppressing fouling of the graphic.

A decorative sheet according to another aspect of the present invention has a back surface and a front surface. The decorative sheet includes a transfer layer and a base material sheet. The transfer layer is transferred with the back surface bonded to a molded body and the front surface facing a side opposite to the molded body to decorate a molded article including the light-transmissive molded body having a three-dimensional shape or a two-dimensional shape. The base material sheet supports the transfer layer to be peelable. The transfer layer includes a protective layer, a first graphic layer, a second graphic layer, an optical functional layer, and an adhesive layer. The protective layer has a first main surface and a second main surface and transmits visible light. The first graphic layer is provided on a side of the second main surface of the protective layer. The first graphic layer contains a plurality of kinds of interference pigments in a first group that emit respective interference lights having a plurality of colors different from one another in a first direction heading from the back surface of the transfer layer to the front surface of the transfer layer in a first binder that transmits visible light to exhibit a first mixed color. The second graphic layer is provided on a side of the second main surface of the protective layer. The second graphic layer contains a plurality of kinds of interference pigments in a second group that emit respective interference lights having a plurality of colors different from one another in the first direction in a second binder that transmits visible light to exhibit a second mixed color different from the first mixed color. The optical functional layer is provided closer to the front surface of the transfer layer than the first graphic layer and the second graphic layer. The optical functional layer has an optical function that changes a reflectance property of light and transmits visible light. The adhesive layer is provided on the back surface of the transfer layer. The adhesive layer transmits visible light and is bondable to the molded body. The first graphic layer and the second graphic layer are configured such that a first planer shape of the first graphic layer and a second planer shape of the second graphic layer are combined to represent a graphic visually recognizable from a side of the front surface of the transfer layer and the interference pigments in the first group, the interference pigments in the second group, the first binder, and the second binder transmit incident light traveling in the first direction to allow visually recognizing an image displayed on a side of the back surface of the transfer layer from the side of the front surface of the transfer layer. The optical functional layer is configured to have a reflectance property. The reflectance property increases a ratio of at least one of an amount of visible light representing the graphic and an amount of visible light representing the image and passing through the first graphic layer and the second graphic layer with respect to an amount of visible light reflected by and visible on the front surface of the transfer layer.

In the first graphic layer and the second graphic layer of the decorative sheet according to another aspect, the plurality of kinds of interference pigments are mixed in the respective first group and second group. Thus, the first mixed color and the second mixed color produced by mixing the interference pigments are less likely to change due to heat and pressure during injection molding. This allows suppressing change in the graphic with the first mixed color and the second mixed color. In addition, since the amount of visible light passing through the first main surface of the protective layer from the first graphic layer and the second graphic layer to be visually recognized becomes larger than an amount of noise, such as reflected light at the first main surface, by the optical functional layer, the graphic is clear and a quality of the graphic can be improved.

The optical functional layer of the above-described decorative sheet may have an optical function that increases an amount of transmitted light and reduces an amount of reflected light. By reducing the reflected light, the amount of light reaching the first graphic layer and the second graphic layer increases, and thus the amount of interference light emitted from the graphic combining the first planar shape and the second planar shape increases. As a result, the graphic is clear and a quality of the graphic can be improved.

In the decorative sheet described above, the base film may be disposed closer to the front surface than the first graphic layer and the second graphic layer. The optical functional layer may be formed on the first main surface of the base film. The optical functional layer formed in this manner is located at an interface with an air layer. This facilitates enhancing the function of increasing the transmitted light passing through the first main surface of the base film and reducing the reflected light.

The optical functional layer of the above-described decorative sheet may have an optical function that diffuses reflected light. Diffusing the reflected light of light incident on an inside from an outside of the decorative sheet allows suppressing a difficulty in seeing the graphic and the image due to the reflected light. Diffusing the reflected light of light traveling inside the decorative sheet toward the front surface allows suppressing a difficulty in seeing the image due to additional reflection of the reflected light at the front surface of the decorative sheet by the interference pigments.

The above-described decorative sheet may include a transmittance adjustment layer. The transmittance adjustment layer is provided closer to the back surface than the first graphic layer and the second graphic layer to adjust a transmittance. In the decorative sheet configured in this way, the amount of visible light transmitted from the back surface to the front surface can be adjusted to an appropriate amount by the transmittance adjustment layer, and while ensuring the visibility of the displayed image, the device for displaying the image present on the back side can be sufficiently hidden while the image is not displayed.

A method for manufacturing a molded article according to one aspect of the present invention includes setting a decorative sheet into a cavity of a mold, and injecting a molten material in the mold to mold a transmissive molded body and fixedly securing the decorative sheet to the molded body simultaneously. The decorative sheet includes a base film, a first graphic layer, a second graphic layer, an optical functional layer, and an adhesive layer. The base film has a first main surface and a second main surface and transmits visible light. The first graphic layer is provided on a side of the second main surface of the base film. The first graphic layer contains a plurality of kinds of interference pigments in a first group that emit respective interference lights having a plurality of colors different from one another in a first direction heading from a back surface of the decorative sheet to a front surface of the decorative sheet in a first binder to exhibit a first mixed color. The second graphic layer is provided on a side of the second main surface of the base film, The second graphic layer contains a plurality of kinds of interference pigments in a second group that emit respective interference lights having a plurality of colors different from one another in the first direction in a second binder to exhibit a second mixed color different from the first mixed color. The optical functional layer is provided closer to the first main surface than the first graphic layer and the second graphic layer. The optical functional layer has an optical function that changes a reflectance property of light that passes through the first main surface. The adhesive layer is provided on the back surface of the decorative sheet. The adhesive layer transmits visible light and is bondable to the molded body. The first graphic layer and the second graphic layer are configured such that a first planer shape of the first graphic layer and a second planer shape of the second graphic layer are combined to represent a graphic visually recognizable from a side of the front surface and the interference pigments in the first group, the interference pigments in the second group, the first binder, and the second binder transmit incident light traveling in the first direction to allow visually recognizing an image displayed on a side of the back surface from the side of the front surface. The optical functional layer is configured to have a reflectance property. The reflectance property increases an amount of visible light representing the graphic formed by the first graphic layer and the second graphic layer and an amount of visible light representing the image and passing through the first graphic layer and the second graphic layer and reduces an amount of visible light generated by being reflected by and visible on the front surface.

In a method for manufacturing a molded article according to one aspect, in the first graphic layer and the second graphic layer, the plurality of kinds of interference pigments are mixed in the respective first group and second group. Thus, the first mixed color and the second mixed color produced by mixing the interference pigments are less likely to change due to heat and pressure during injection molding. This allows suppressing change in the graphic with the first mixed color and the second mixed color. In addition, since the amount of visible light passing through the first main surface of the base film from the first graphic layer and the second graphic layer to be visually recognized becomes larger than an amount of noise, such as reflected light at the first main surface, by the optical functional layer, the graphic is clear and a quality of the graphic can be improved.

A method for manufacturing a molded article according to another aspect of the present invention includes setting a decorative sheet into a cavity of a mold, and injecting a molten material in the mold to mold a transmissive molded body and transferring a transfer layer of the decorative sheet to the molded body simultaneously. The transfer layer includes a protective layer, a first graphic layer, a second graphic layer, an optical functional layer, and an adhesive layer. The protective layer has a first main surface and a second main surface and transmits visible light. The first graphic layer is provided on a side of the second main surface of the protective layer. The first graphic layer contains a plurality of kinds of interference pigments in a first group that emit respective interference lights having a plurality of colors different from one another in a first direction heading from the back surface of the transfer layer to the front surface of the transfer layer in a first binder that transmits visible light to exhibit a first mixed color. The second graphic layer is provided on a side of the second main surface of the protective layer. The second graphic layer contains a plurality of kinds of interference pigments in a second group that emit respective interference lights having a plurality of colors different from one another in the first direction in a second binder that transmits visible light to exhibit a second mixed color different from the first mixed color. The optical functional layer is provided closer to the front surface than the first graphic layer and the second graphic layer. The optical functional layer has an optical function that changes a reflectance property of light and transmits visible light. The adhesive layer is provided on the back surface. The adhesive layer transmits visible light and is bondable to the molded body. The first graphic layer and the second graphic layer are configured such that a first planer shape of the first graphic layer and a second planer shape of the second graphic layer are combined to represent a graphic visually recognizable from a side of the front surface and the interference pigments in the first group, the interference pigments in the second group, the first binder, and the second binder transmit incident light traveling in the first direction to allow visually recognizing an image displayed on a side of the back surface from the side of the front surface. The optical functional layer is configured to have a reflectance property. The reflectance property increases a ratio of at least one of an amount of visible light representing the graphic and an amount of visible light representing the image and passing through the first graphic layer and the second graphic layer with respect to an amount of visible light reflected by and visible on the front surface. In a method for manufacturing a molded article according to another aspect, in the first graphic layer and the second graphic layer, the plurality of kinds of interference pigments are mixed in the respective first group and second group. Thus, the first mixed color and the second mixed color produced by mixing the interference pigments are less likely to change due to heat and pressure during injection molding. This allows suppressing change in the graphic with the first mixed color and the second mixed color. In addition, since the amount of visible light passing through the first main surface of the protective layer from the first graphic layer and the second graphic layer to be visually recognized becomes larger than an amount of noise, such as reflected light at the first main surface, due to the optical functional layer, the graphic is clear and a quality of the graphic can be improved.

Advantageous Effects of Invention

The decorative sheet of the present invention allows for suppressing deterioration of the graphic that decorates the molded body even when the heat and the pressure are applied during the injection molding. The method for manufacturing the molded article of the present invention allows for providing the molded article in which the graphic of the decorated molded body after injection molding is less deteriorated.

DESCRIPTION OF EMBODIMENTS

First Embodiment

(1) Overall Configuration

Figure 1:
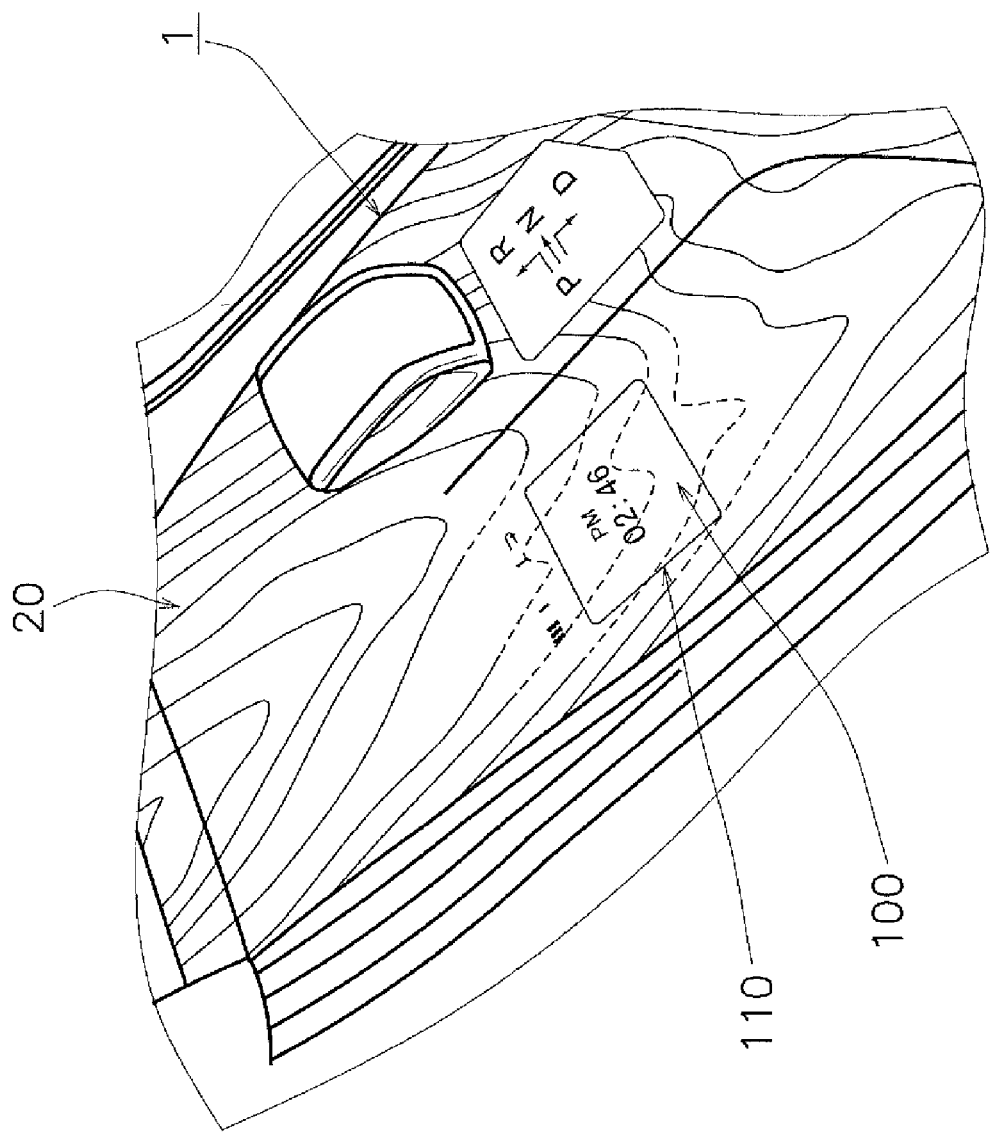
FIG. 1 is a perspective view of a center console that displays an image that transmits through a decorative sheet.
Figure 2:
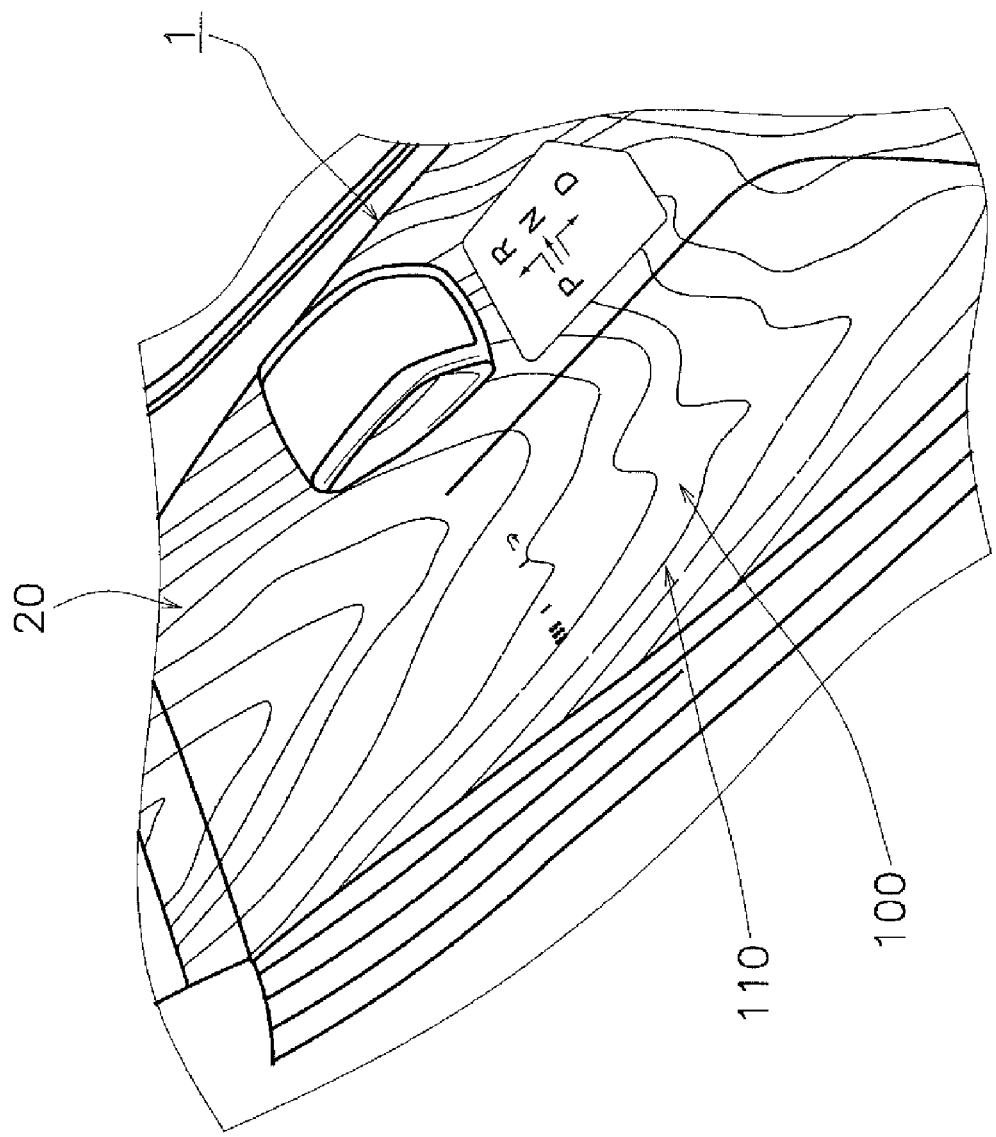
FIG. 2 is a perspective view of the center console that does not display the image that transmits through the decorative sheet.

FIG. 1 and FIG. 2 illustrate a decorative sheet 20 according to the first embodiment and a center console 1, which is a molded article, of an automobile including the decorative sheet 20. The decorative sheet 20 having a grain design is pasted to an exposed portion of the center console 1. The decorative sheet 20 is one of the components constituting the center console 1 formed by injection molding. The decorative sheet 20 is integrally molded with a molded body 2 (see FIG. 3) of the center console 1 simultaneously with injection molding of the center console 1. Here, the case in which the grain design of the decorative sheet 20 is a graphic will be described, but the graphic of the decorative sheet 20 is not limited to the grain design. The molded body 2 is formed of, for example, a transparent thermoplastic resin or a transparent thermoplastic elastomer.

Figure 3:
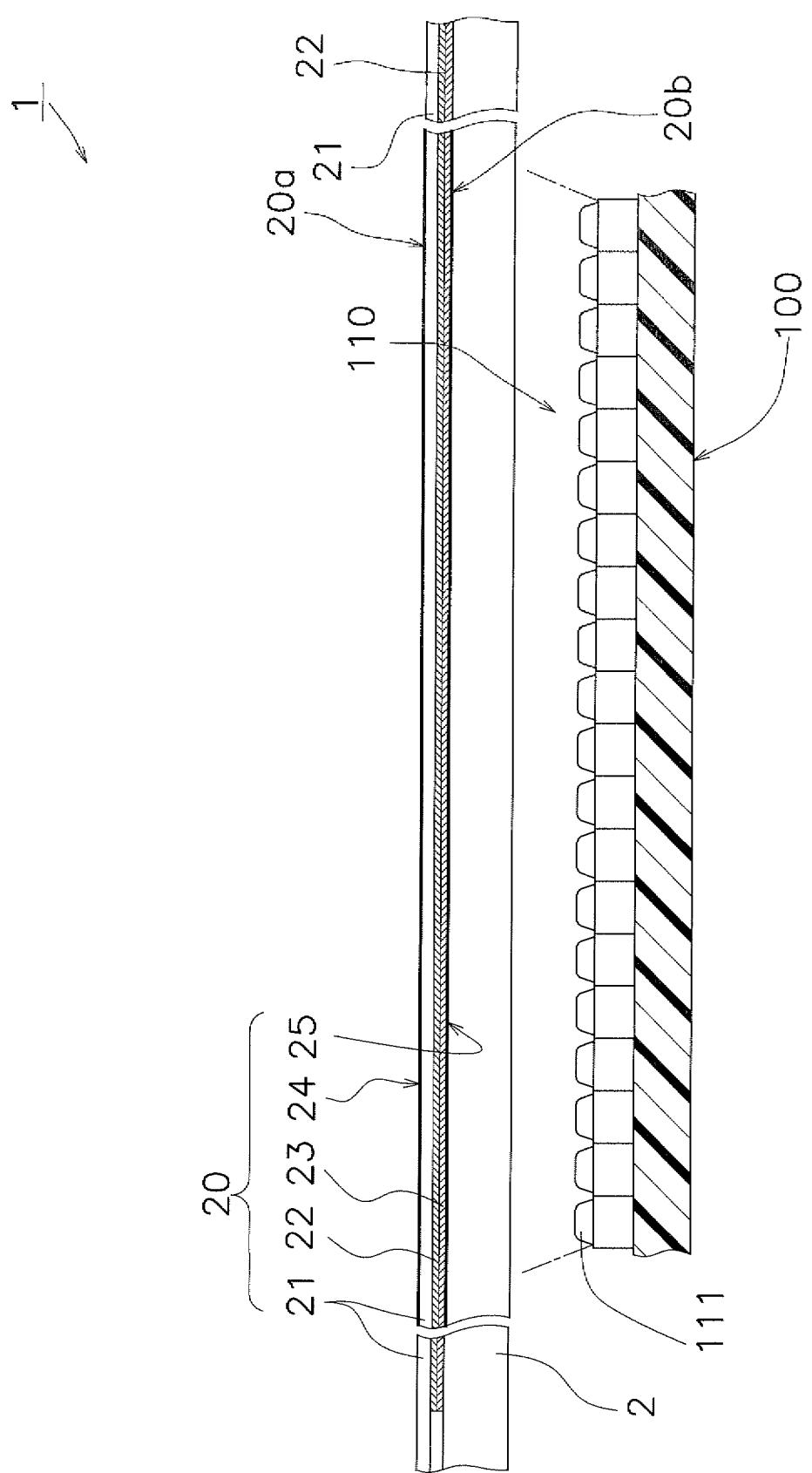
FIG. 3 is a schematic view for describing display of an image on the decorative sheet by a display device.

FIG. 3 illustrates an overview of a configuration example of a display device 100. The display device 100 includes a plurality of light sources 111 disposed in a matrix. A plurality of LEDs can be used for the plurality of light sources 111, for example.

The display device 100 is mounted to the center console 1 of the automobile. A screen 110 of the display device 100 is disposed below the decorative sheet 20 and the molded body 2. The screen 110 is disposed such that irradiated light passes through the molded body 2 and the decorative sheet 20. Accordingly, a driver of the automobile can see an image on the screen 110 that transmits through the decorative sheet 20.

The time, 2:46 PM is displayed on this screen 110. The character "PM" and the portions of the numbers indicating the time, "02" and "46," light in the screen 110. These letters and numbers are images. Here, the case in which the image is a character and a code, such as a number, is described, but the image may be a decorative graphic or a signal, for example, and is not limited to a code or a figure to transmit information.

When the display of the screen 110 in the display device 100 disappears, as illustrated in FIG. 2, the grain design of the decorative sheet 20 is visually recognized entirely.

Figure 4:
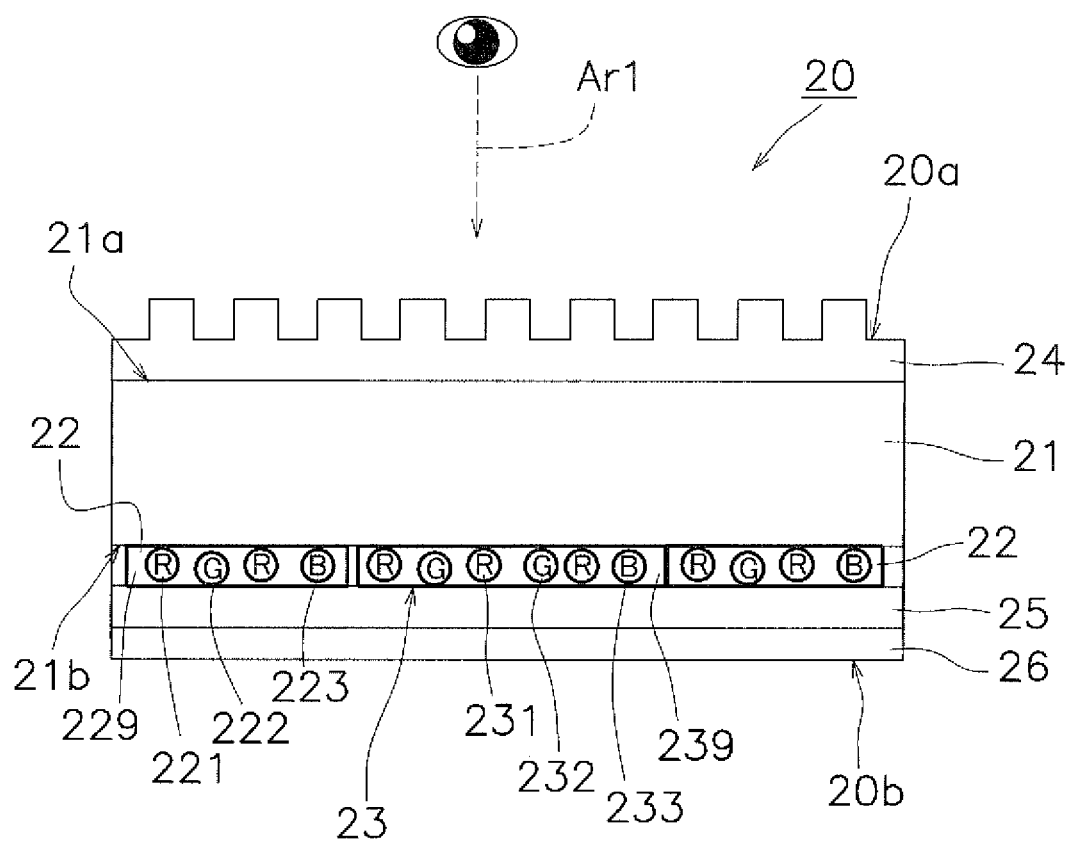
FIG. 4 is a schematic cross-sectional view illustrating an example of a configuration of the decorative sheet of a first embodiment.

FIG. 4 schematically illustrates a cross-sectional structure of the decorative sheet 20. The decorative sheet 20 illustrated in FIG. 4 includes a base film 21, a first graphic layer 22, a second graphic layer 23, an optical functional layer 24, a transmittance adjustment layer 25, and an adhesive layer 26.

The base film 21 is a film that transmits visible light. Here, a case where the base film 21 is transparent will be described, but the base film 21 may be translucent. The base film 21 includes a first main surface 21$a$ and a second main surface 21$b$. The decorative sheet 20 illustrated in FIG. 3 has the first main surface 21$a$ of the base film 21 facing outside the center console 1, which is the molded article, and the second main surface 21$b$ facing inside the center console 1. The first graphic layer 22 and the second graphic layer 23 are provided on the side of the second main surface 21$b$. In other words, the first graphic layer 22 and the second graphic layer 23 are disposed inside the center console 1 than the base film 21. The first graphic layer 22 and the second graphic layer 23 are fixedly fixed to the base film 21.

The first graphic layer 22 includes red interference pigments 221 that emit red interference light, green interference pigments 222 that emit green interference light, and blue interference pigments 223 that emit blue interference light. To fixedly secure these interference pigments 221 to 223 to the base film 21, the first graphic layer 22 includes a first binder 229 that transmits visible light.

The second graphic layer 23 includes red interference pigments 231 that emit red interference light, green interference pigments 232 that emit green interference light, and blue interference pigments 233 that emit blue interference light. To fixedly secure these interference pigments 231 to 233 to the base film 21, the second graphic layer 23 includes a second binder 239 that transmits visible light.

In this way, the first graphic layer 22 contains three kinds of the interference pigments 221 to 223 in a first group that emit the three colors, red, green, and blue, of the interference lights in the first binder 229, which transmits visible light. Here, the first graphic layer 22 exhibits ocher in the grain design by three kinds of the interference pigments 221 to 223 in the first group. The ocher exhibited by the first graphic layer 22 is a first mixed color. The ocher is expressed by additive color mixing of the interference light of the interference pigments 221 to 223 in the first group with an amount of light at a first proportion.

Also, the second graphic layer 23 includes the three kinds of the interference pigments 231 to 233 in a second group that emit the three colors, red, green, and blue, of the interference light in the second binder 239, which transmits visible light. Here, the second graphic layer 23 exhibits a dark brown in the grain design by three kinds of the interference pigments 231 to 233 in the second group. The dark brown exhibited by the second graphic layer 23 is a second mixed color. The dark brown is expressed by additive color mixing of the interference light of the interference pigments 231 to 233 in the second group with an amount of light at a second proportion.

Here, the red interference pigment 221 that emits the red interference light used in the first graphic layer 22 and the red interference pigment 231 that emits the red interference light used in the second graphic layer 23 are the same kind. Similarly, the green interference pigments 222 and 232 are the same kind and the blue interference pigments 223 and 233 are the same kind. Nevertheless, the reason that the first mixed color (ocher) exhibited by the first graphic layer 22 and the second mixed color (dark brown) exhibited by the second graphic layer 23 differ from one another is that composition ratios of the red interference pigment 221, the green interference pigment 222, and the blue interference pigment 223 differ from composition ratios of the red interference pigment 231, the green interference pigment 232, and the blue interference pigment 233.

Note that the case where the interference pigments 221 to 223 in the first group of the first graphic layer 22 and the interference pigments 231 to 233 in the second group of the second graphic layer 23 are the same kinds is described here, but may be different. For example, even when the interference pigments 221 and 231 emit the same red interference light, frequencies of the interference lights may be shifted, or the same red but different colors of red being emitted may be used.

The kind of the color of the interference pigment in the first group contained in the first graphic layer 22 and the kind of the interference pigment in the second group contained in the second graphic layer 23 may be different. For example, there may be a case where the first graphic layer 22 contains the red interference pigment 221 and the green interference pigment 222, and the second graphic layer 23 contains the green interference pigment 232 and the blue interference pigment 233. Furthermore, the number of colors of the interference pigments contained in the first graphic layer 22 and the number of colors of the interference pigments contained in the second graphic layer 23 may be different. For example, there may be a case where the first graphic layer 22 contains one color of the red interference pigment 221, and the second graphic layer 23 contains two colors of the red interference pigment 231 and the green interference pigment 232. In other words, in this case, one color of the red interference pigment 221 forms the first group, and the two colors of the red interference pigment 231 and the green interference pigment 232 form the second group.

As viewed in an arrow Ar1 direction in FIG. 4, a first planar shape of the first graphic layer 22 differs from a second planar shape of the second graphic layer 23. A combination of the first planar shape of the first graphic layer 22 and the second planar shape of the second graphic layer 23 represent a graphic in the grain design.

Figure 5:
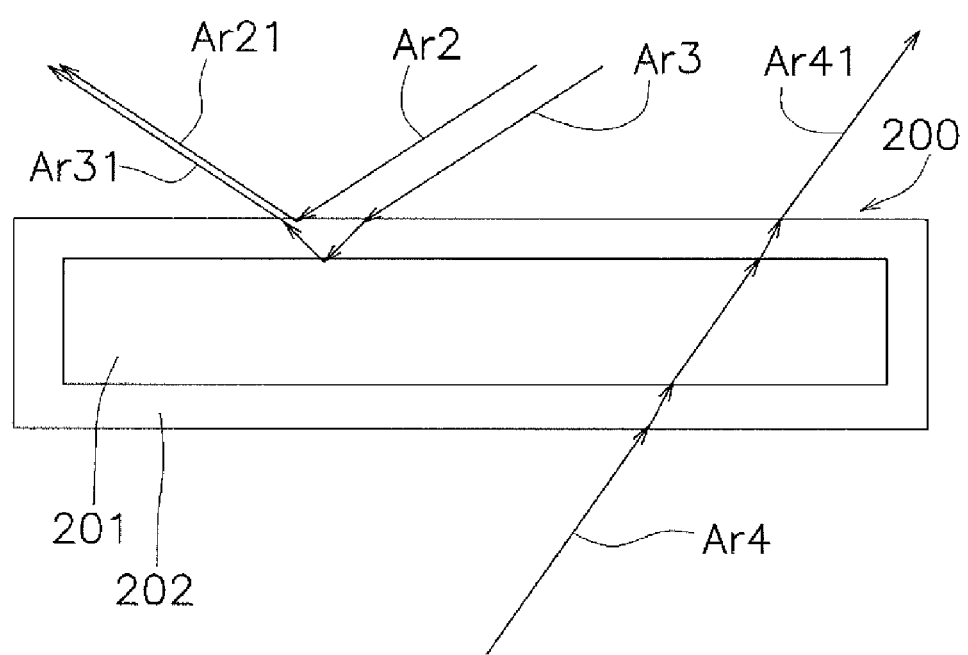
FIG. 5 is a schematic view for describing reflection and transmission of light in an interference pigment.

FIG. 5 schematically illustrates an example of a cross-sectional structure of particles of an interference pigment 200. The interference pigment 200 includes a core portion 201 and a thin shell portion 202 covering the core portion 201. The core portion 201 and the shell portion 202 transmit any visible light. The core portion 201 and the shell portion 202 are made of materials having different refractive indexes. For example, the refractive index of the core portion 201 is smaller than the refractive index of the shell portion 202. Arrows Ar2 and Ar3 are incident lights incident on the shell portion 202 of the interference pigment 200. A portion of the incident light indicated by the arrow Ar3 travels an inside of the shell portion 202, is reflected by the core portion 201, and becomes reflected light Ar, which is indicated by an arrow Ar31. In addition, a portion of the incident light indicated by the arrow Ar2 is reflected by the surface of the shell portion 202 and becomes reflected light indicated by an arrow Ar21. The reflected light indicated by the arrow Ar21 interferes with the reflected light indicated by the arrow Ar31 to mutually strengthen, and thus interference light at a specific wavelength is strongly visually recognized. For example, a thickness of the shell portion 202 is adjusted such that the wavelength strengthened by the interference becomes a red wavelength, thus ensuring obtaining the red interference pigment.

Visible light representing the image on the screen 110 is also incident on the interference pigment 200. The visible light from the image incident on the interference pigment 200 is indicated by an arrow Ar4 in FIG. 5. The visible light indicated by the arrow Ar4 is incident on the interference pigment 200, passes through the interference pigment 200, and exits from the opposite side of the interference pigment 200. The visible light of the image that has passed through the interference pigment 200 is transmitted light indicated by an arrow Ar41.

Accordingly, in the first graphic layer 22 and the second graphic layer 23, the interference pigments 221 to 223 contained in the first graphic layer 22, the interference pigments 231 to 233 contained in the second graphic layer 23, the first binder 229, and the second binder 239 transmit the incident light traveling in a first direction. Even when the decorative sheet 20 includes the first graphic layer 22 and the second graphic layer 23, the image on the screen 110 displayed on a side of a back surface 20b of the decorative sheet 20 is visually recognizable from a side of a front surface 20a of the decorative sheet 20.

The optical functional layer 24 is provided closer to the front surface 20a of the decorative sheet 20 than the first graphic layer 22 and the second graphic layer 23. The optical functional layer 24 has an optical function that changes a reflectance property of light at the front surface 20a of the decorative sheet 20. To describe the optical function in more detail, the optical functional layer 24 is configured to have the reflectance property that increases a ratio of at least one of an amount of visible light representing the graphic and an amount of visible light representing the image on the screen 110 to an amount of visible light reflected by the front surface 20a and visually recognized by a user (the driver of the automobile) by changing the reflectance property of the front surface 20a of the decorative sheet 20. Here, the amount of visible light representing the graphic is the amount of visible light representing the graphic formed by a combination of the first planar shape of the first graphic layer 22 and the second planar shape of the second graphic layer 23. The amount of visible light representing the image on the screen 110 is the amount of visible light representing the image on the screen 110 and passing through the first graphic layer 22 and the second graphic layer 23.

(1-1) Function of Suppressing Reflection by Front Surface 20a of Decorative Sheet 20

Figure 6:
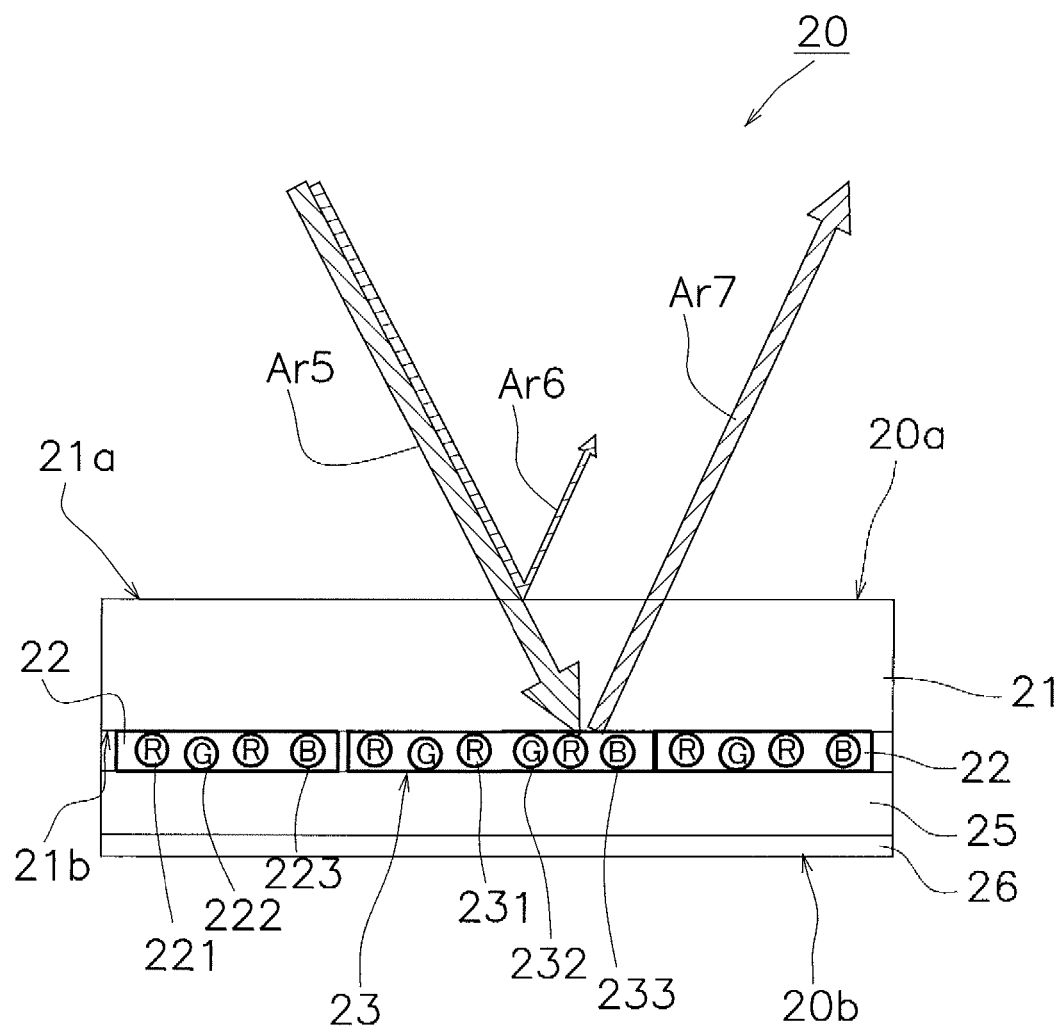
FIG. 6 is a schematic cross-sectional view of the decorative sheet for describing the relationship between the reflected light on the surface of the base film and the interference pigments.

FIG. 6 schematically illustrates a cross-sectional structure of the decorative sheet 20 in which the optical functional layer 24 is not provided. When the optical functional layer 24 is not provided, in the decorative sheet 20 illustrated in FIG. 6, the front surface 20a of the decorative sheet 20 becomes the first main surface 21a of the base film 21. The base film 21 is, for example, a transparent resin film with the smooth and flat first main surface 21a. For example, among incident lights indicated by arrows Ar5 and Ar6, reflected light indicated by the arrow Ar6 is generated in the smooth and flat first main surface 21a. The amount of light (the light indicated by arrow Ar5) that reaches the first graphic layer 22 and the second graphic layer 23 by the reflected light indicated by the arrow Ar6 is approximately 95%, for example, of the amount of incident light indicated by the arrows Ar5 and Ar6. A portion of the light indicated by the arrow Ar5 is reflected by the interference pigments 221 to 223 and 231 to 233. Light of an arrow Ar7 reflected by the interference pigments 221 to 223 and 231 to 233 becomes interference light visually recognized by the user (the driver).

Figure 7:
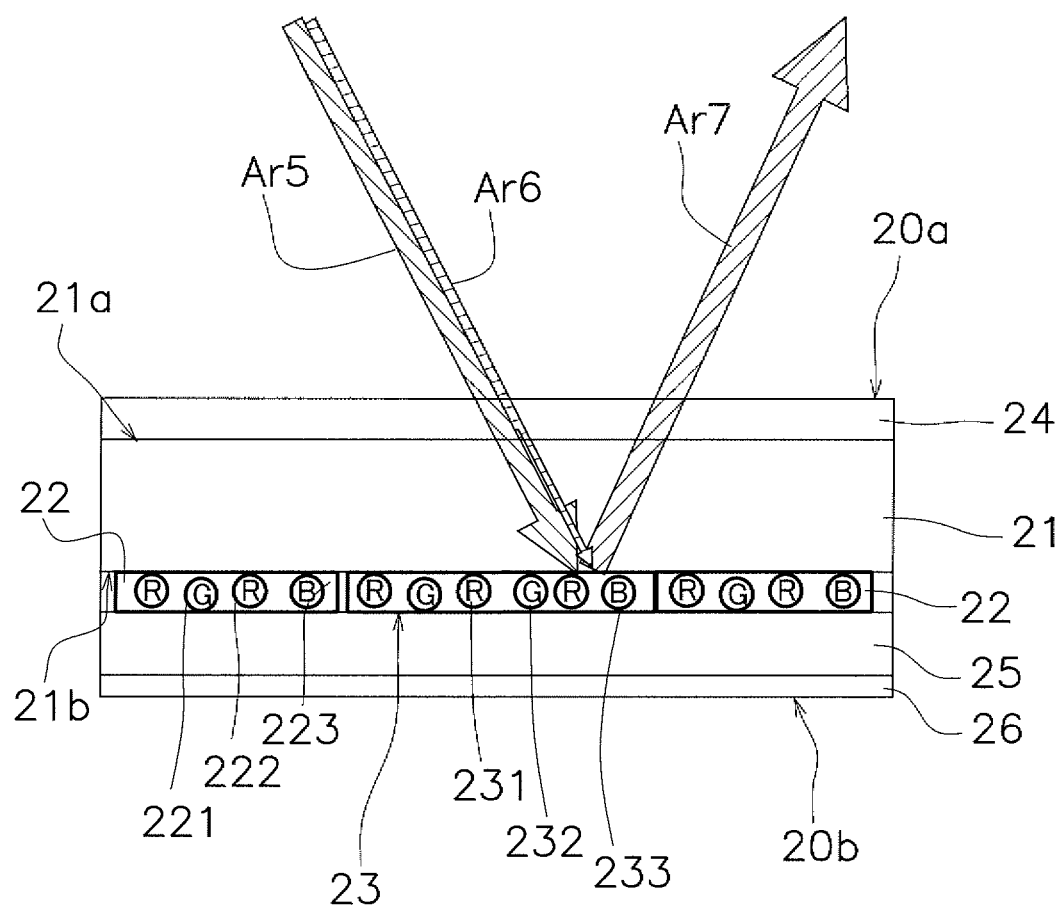
FIG. 7 is a schematic cross-sectional view of the decorative sheet for describing a relationship between suppression of the reflected light by an optical functional layer and the interference pigments.

FIG. 7 schematically illustrates a cross-sectional structure of the decorative sheet 20 provided with the optical functional layer 24. The optical functional layer 24 illustrated in FIG. 7 has an optical function that increases the amount of transmitted light and reduces the amount of reflected light in the front surface 20a of the decorative sheet 20. For example, the reflected light indicated by the arrow Ar6 in FIG. 6 is reduced to reach the most part of the light indicated by the arrow Ar6 up to the interference pigments 221 to 223 and 231 to 233. As a result, compared to the case of use of the decorative sheet 20 illustrated in FIG. 6, the decorative sheet 20 illustrated in FIG. 7 can increase the amount of interference light indicated by the arrow Ar7. For example, reducing the amount of reflected light by approximately 1% allows increasing the amount of interference light by approximately 4%. The optical functional layer 24 can be formed by applying the conventional technique of an anti-reflection film.

Figure 8:
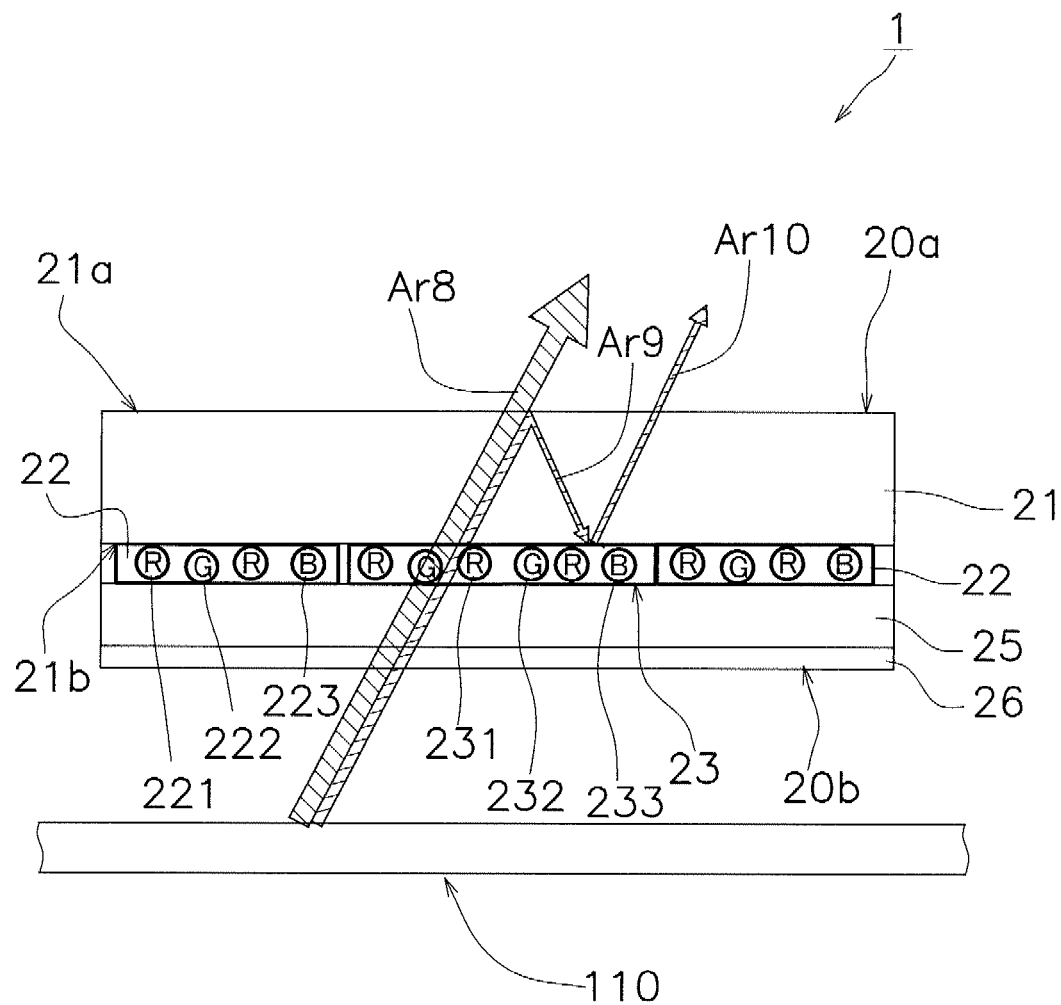
FIG. 8 is a schematic cross-sectional view of the decorative sheet for describing the relationship between the reflected light on the surface of the base film and the interference pigments.

FIG. 8 schematically illustrates a cross-sectional structure of the decorative sheet 20 in which the optical functional layer 24 is not provided. When the optical functional layer 24 is not provided, in the decorative sheet 20 illustrated in FIG. 8, the front surface 20a of the decorative sheet 20 becomes the first main surface 21a of the base film 21. For example, among lights irradiated from the screen 110 indicated by arrows Ar8 and Ar9, reflected light indicated by the arrow Ar9 is generated in the smooth and flat first main surface 21a. The amount of light (the light indicated by arrow Ar9) that reaches the first graphic layer 22 and the second graphic layer 23 by the reflected light indicated by the arrow Ar9 is approximately 5%, for example, of the amount of incident light indicated by the arrows Ar8 and Ar9. A portion of the light indicated by the arrow Ar9 is reflected by the interference pigments 221 to 223 and 231 to 233. The light is reflected by the interference pigments 221 to 223 and 231 to 233 to generate interference light (the light indicated by an arrow Ar10) visually recognized by the user (the driver). The light indicated by the arrow Ar10 is noise for an image that is desired to be delivered to the driver of the automobile by the light indicated by the arrow Ar8.

Figure 9:
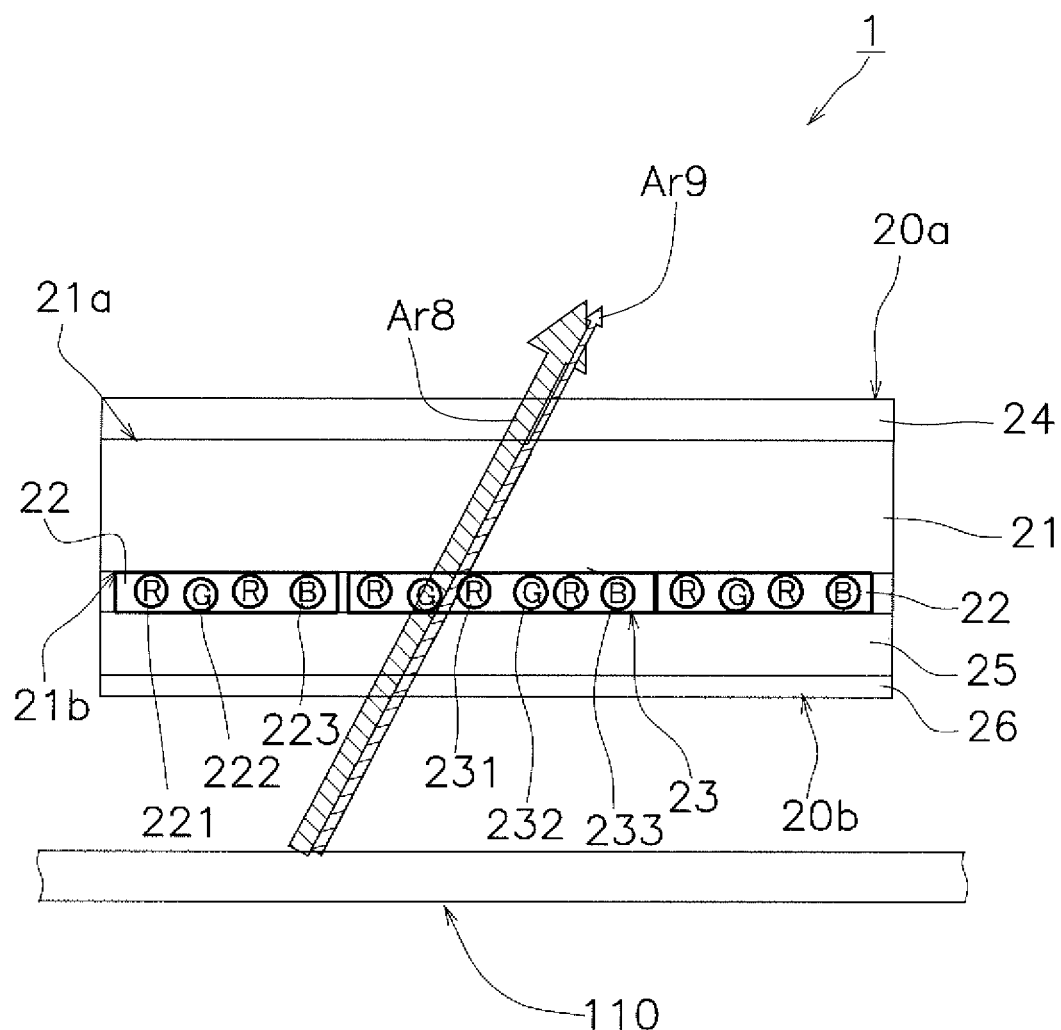
FIG. 9 is a schematic cross-sectional view of the decorative sheet for describing the relationship between suppression of the reflected light by the optical functional layer and the interference pigments.

FIG. 9 schematically illustrates the cross-sectional structure of the decorative sheet 20 provided with the optical functional layer 24. Similar to the optical functional layer 24 illustrated in FIG. 7, the optical functional layer 24 illustrated in FIG. 9 has an optical function that increases the amount of transmitted light and reduces the amount of reflected light in the front surface 20a of the decorative sheet 20. Compared to the case of use of the decorative sheet 20 illustrated in FIG. 8, the decorative sheet 20 illustrated in FIG. 9 can increase the amount of light representing the image indicated by the arrow Ar9 and reduce extra interference light indicated by the arrow Ar10. The optical functional layer 24 can be formed by applying the conventional technique of the anti-reflection film.

(1-2) Function of Diffusing Reflected Light at Front Surface 20a of Decorative Sheet 20

Figure 10:
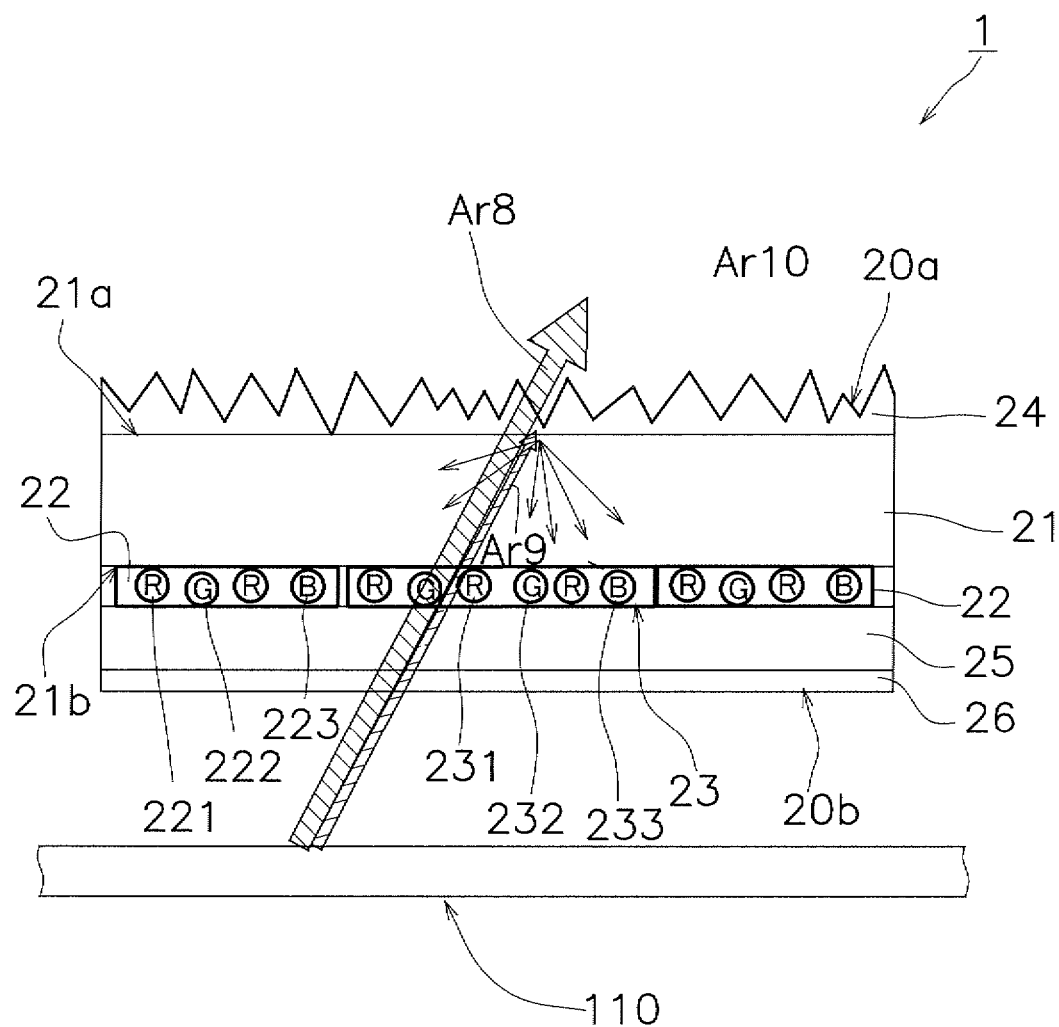
FIG. 10 is a schematic cross-sectional view of the decorative sheet for describing a relationship between diffusion of the reflected light by the optical functional layer and the interference pigments.

FIG. 10 schematically illustrates a cross-sectional structure of the decorative sheet 20 in which the optical functional layer 24 is not provided. The optical functional layer 24 illustrated in FIG. 10 has an optical function that diffuses the reflected light. Compared to the case of using the decorative sheet 20 illustrated in FIG. 8, the decorative sheet 20 illustrated in FIG. 10 can diffusely reflect the extra interference light indicated by the arrow Ar10. The optical functional layer 24 can be obtained by, for example, forming fine irregularities in the front surface 20a of the decorative sheet 20.

(1-3) Transmittance Adjustment Layer 25

The transmittance adjustment layer 25 is provided closer to the back surface 20b of the decorative sheet 20 than the first graphic layer 22 and the second graphic layer 23. The transmittance adjustment layer 25 has a function of reducing an amount of transmitted light that has passed through the transmittance adjustment layer 25 with respect to the amount of incident light that is incident on the transmittance adjustment layer 25. In other words, the transmittance adjustment layer 25 is a layer having a transmittance smaller than a transmittance of the base film 21. Accordingly, the transmittance adjustment layer 25 is a so-called translucent layer.

Even when the transmittance adjustment layer 25 is provided, the image displayed on the screen 110 of the display device 100 is viewable. However, by providing the transmittance adjustment layer 25, a figure of the display device 100 itself not displaying an image can be suppressed from being seen from outside the decorative sheet 20.

Here, the case where the transmittance adjustment layer 25 is provided is described, but the transmittance adjustment layer 25 is not a layer necessarily to be provided to embody the present invention and may be omitted as necessary.

(2) Method for Manufacturing Center Console 1

The manufacturing method for integrally molding the molded body 2 and the decorative sheet 20 of the center console 1 as the molded article will be described, and description of manufacturing processes of the other portions of the center console 1 will be omitted.

The decorative sheet 20 used in the method for manufacturing the center console 1 of the first embodiment is pre-formed. When a deformation of the shape between before and after molding of the decorative sheet 20 is small, the pre-forming may be omitted.

Figure 11:
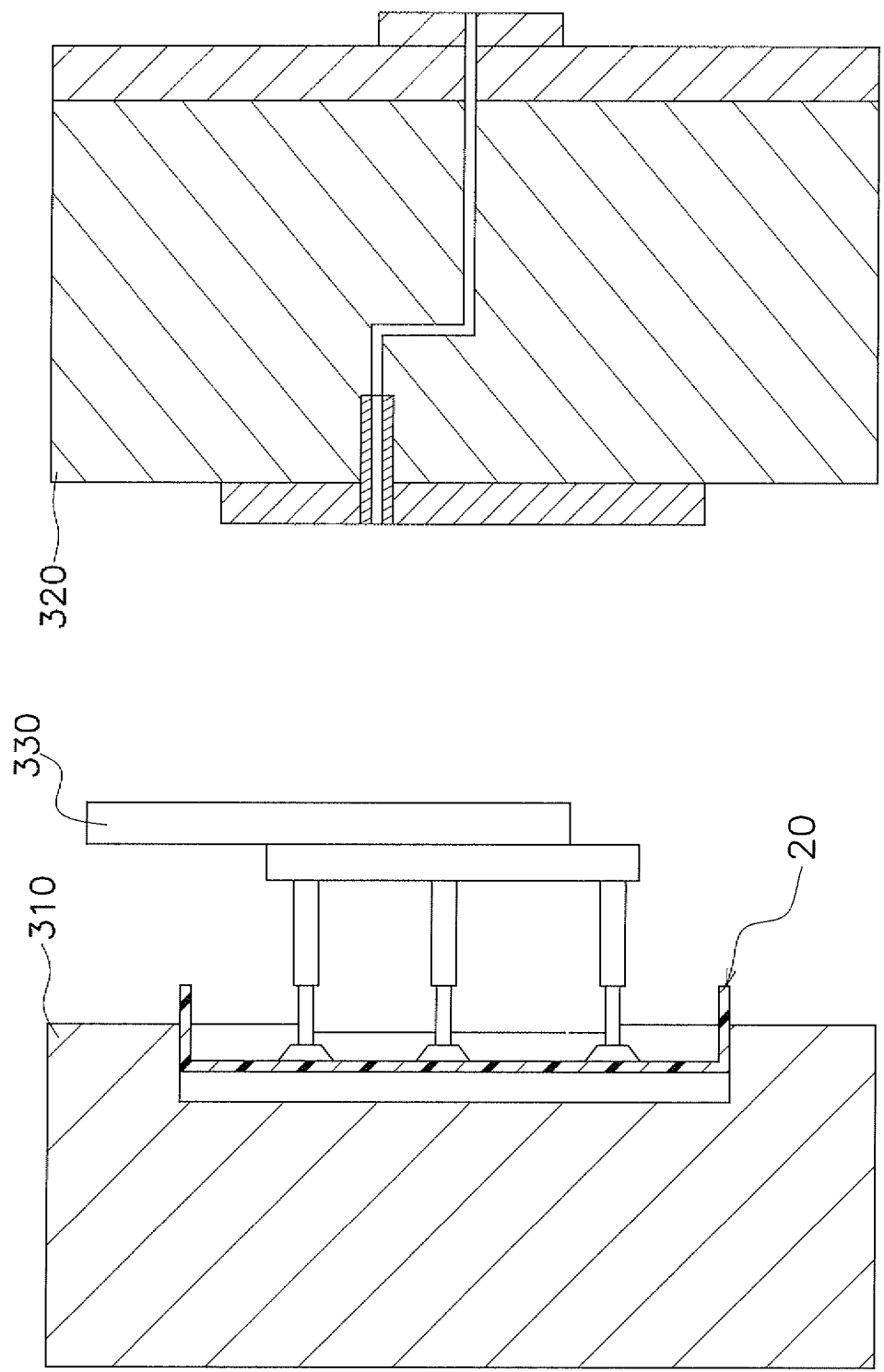
FIG. 11 is a schematic cross-sectional view for describing setting of the decorative sheet to a first mold.

In a first step of the method for manufacturing the molded article, as illustrated in FIG. 11, the decorative sheet 20 is automatically set to a first mold 310 by, for example, a robot arm 330.

Figure 12:
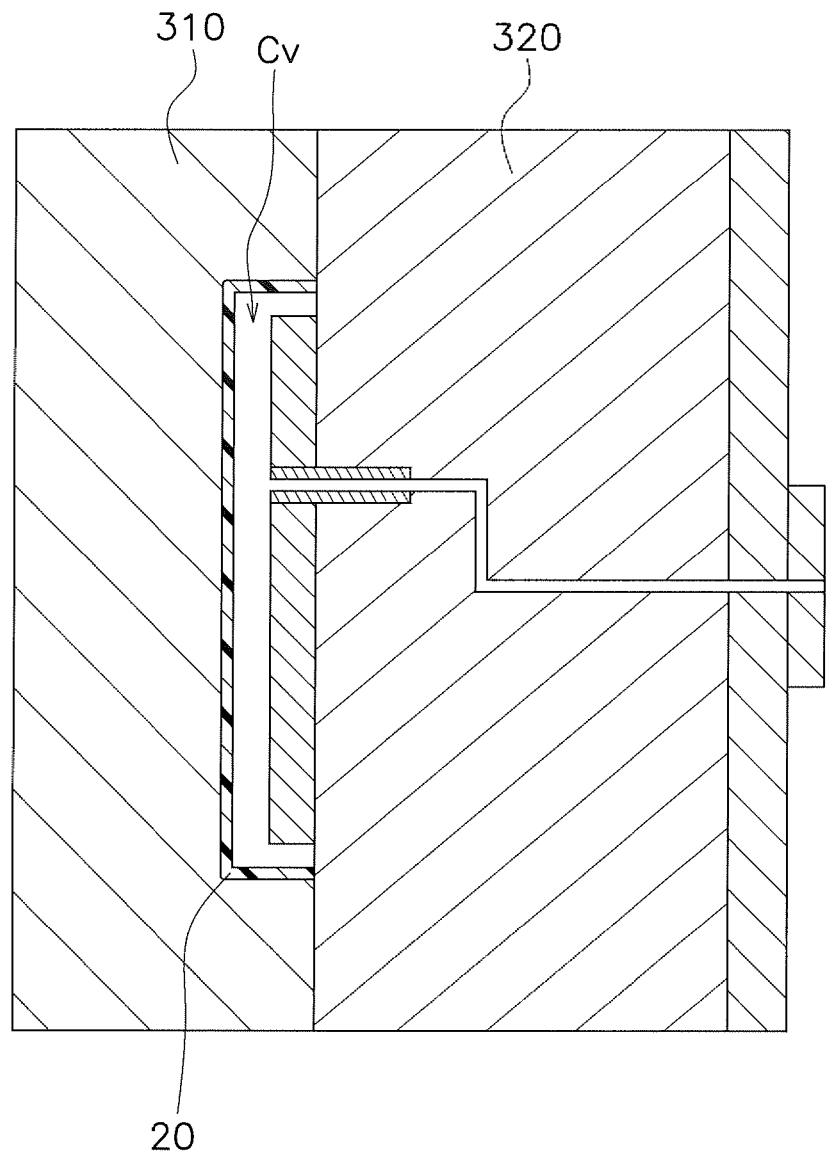
FIG. 12 is a schematic cross-sectional view illustrating a clamped first mold and second mold.

In a second step, as illustrated in FIG. 12, the first mold 310 and a second mold 320 are clamped. With the first mold 310 and the second mold 320 clamped, a cavity Cv formed of the first mold 310 and the second mold 320 is formed.

Figure 13:
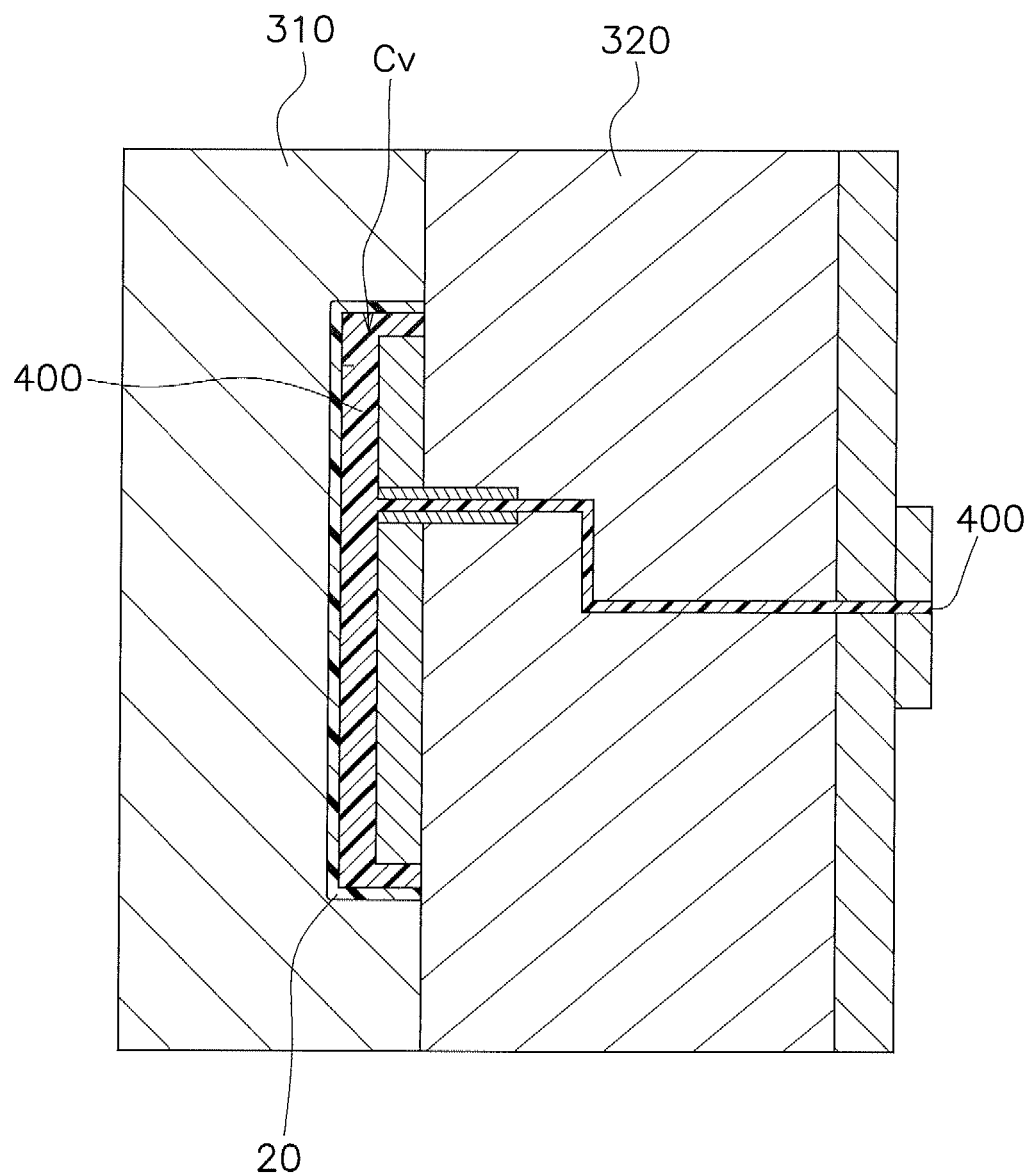
FIG. 13 is a schematic cross-sectional view for describing injection of a molten material into a cavity.
Figure 14:
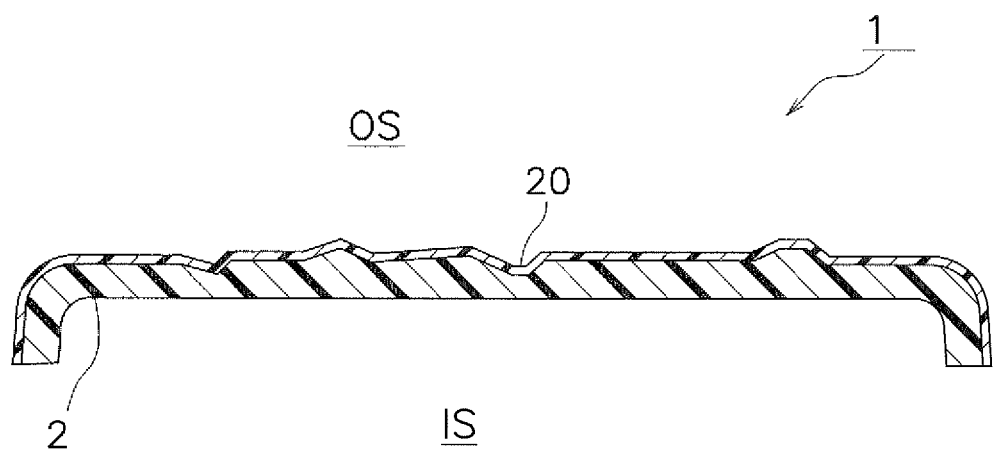
FIG. 14 is a cross-sectional view illustrating an overview of a configuration example of a molded article.

In a third step, as illustrated in FIG. 13, a molten material 400 is injected into the cavity Cv to form the molded body 2 integrally formed with the decorative sheet 20. The molten material includes, for example, a molten resin and a molten elastomer. The molten material 400 in the cavity Cv is cooled to be solidified in the first mold 310 and the second mold 320, thereby molding the center console 1 illustrated in FIG. 14. The decorative sheet 20 covers a portion exposed to an external space OS of the center console 1 as the molded article. The display device 100 is disposed in an internal space IS of the center console 1.

Heat and pressure are applied from the molten material 400 to the decorative sheet 20 during injection molding. However, since content ratios of the interference pigments 221 to 223 and 231 to 233 do not change by the heat and pressure, the ocher (the first mixed color) exhibited by the first graphic layer 22 of the decorative sheet 20 or the dark brown (the second mixed color) exhibited by the second graphic layer 23 does not change.

(3) Detailed Configuration (3-1) Base Film 21

A thickness of the base film 21 is, for example, selected from the range of 10 μm to 1000 μm. As the base film 21, for example, at least one of a light-transmissive resin and a light-transmissive elastomer is used. The base film 21 made of resin is selected from, for example, a resin film made of a polyester resin, a polyethylene terephthalate (PET) resin, an acrylic resin, a polycarbonate resin, a polybutylene terephthalate (PBT) resin, a triacetyl cellulose resin, a styrene resin, or an ABS resin, a multilayer film made of an acrylic resin and an ABS resin, or a multilayer film made of an acrylic resin and a polycarbonate resin. As the elastomer used for the base film 21, for example, a thermoplastic elastomer (TPE) can be used. The thermoplastic elastomer includes, for example, amide-based TPE (TPA), ester-based TPE (TPC), olefin-based TPE (TPO), styrene-based TPE (TPS), and urethane-based TPE (TPU). Note that the base film 21 may be a film in which a resin film and an elastomer film are layered.

(3-2) First Graphic Layer 22 and Second Graphic Layer 23

The thicknesses of the first graphic layer 22 and the second graphic layer 23 are, for example, selected from the range of 1 μm to 50 μm. The first graphic layer 22 and the second graphic layer 23 are formed on the base film 21 by, for example, screen printing, offset printing, flexographic printing, gravure printing, and digital printing using, for example, ink jet or toner. The first binder 229 and the second binder 239 of the first graphic layer 22 and the second graphic layer 23 are made of, for example, a vinyl chloride/vinyl acetate copolymer resin, an acrylic-based resin, a thermoplastic urethane-based resin, and a polyester-based resin.

(3-3) Optical Functional Layer 24

The optical functional layer 24 is, for example, a layer that suppresses reflection by dielectric body when formed by the formation technique of the anti-reflection film. For example, metal oxide or fluoride can be used as the dielectric body. The optical functional layer 24 may be a multilayer film formed by layering two or more kinds of dielectric bodies having different refractive indexes.

The optical functional layer 24 is preferably formed on a hard coat layer having an altitude higher than that of the base film 21. Examples of a material of the hard coat layer in this case include UV curable or ionizing radiation-curable resin, such as polyester acrylate and urethane acrylate, or, for example, acrylic-based and urethane-based thermosetting resins. The hard coat layer is preferably formed to exhibit a hardness equal to or more than HB in a pencil hardness test (load: 750 g) in accordance with JIS K5600-5-4.

(3-4) Transmittance Adjustment Layer 25

The transmittance adjustment layer 25 is, for example, a layer on which ink produced by coloring a transparent binder resin with a pigment or a dye having a dimming color. The transmittance adjustment layer 25 is, for example, a layer with black ink printed thereon. Alternatively, the transmittance adjustment layer 25 is, for example, a metal thin film layer on which a metal is formed to transmit light. Such a metal thin film layer is formed by, for example, depositing a metal.

(3-5) Adhesive Layer 26

The adhesive layer 26 is a layer for adhesion of the decorative sheet 20 to the molded body 2 and can transmit visible light. The adhesive layer 26 has a thickness set in the range, for example, of 1 μm to 50 μm.

For example, the adhesive layer 26 is formed with an acrylic-based resin, a urethane-based resin, a polyester-based resin, a polyvinyl acetate-based resin, a vinyl chloride-based resin, or a vinyl chloride/vinyl acetate copolymer as the main material. For example, a high-polymer material for improving adhesion force may be contained as a secondary material. Here, the main material means a material occupying the half of the weight of the entire material. The adhesive layer 26 is formed by, for example, applying a resin dissolved in a solvent and drying or applying a resin melted by heat and solidifying it. A technique of applying the resin includes, for example, a coating technique and a printing technique. The coating technique includes, for example, a comma coating method. The printing technique includes, for example, gravure printing and offset printing.

Second Embodiment (4) Overall Configuration

In the first embodiment described above, the case where the decorative sheet 20 is used for manufacturing the center console 1 has been described. However, a decorative sheet 60 illustrated in FIG. 15 may be used instead of the decorative sheet 20 to manufacture the center console 1 as the molded article.

It is only necessary to replace the decorative sheet 20 with a transfer layer 70 of the decorative sheet 60, and therefore the description of the overall configuration of the center console 1 as the molded article of the second embodiment is omitted here.

The display device 100 is mounted to the center console 1 of the automobile to which the transfer layer 70 is transferred. The screen 110 of the display device 100 is disposed below the transfer layer 70 transferred to the center console 1 and the molded body 2. In the case where the decorative sheet 20 is replaced by the transfer layer 70 as well, the driver of the automobile can see the image that transmits through the transfer layer 70 on the screen 110. A graphic of the transfer layer 70 can be, for example, the grain design same as the decorative sheet 20.

Figure 15:
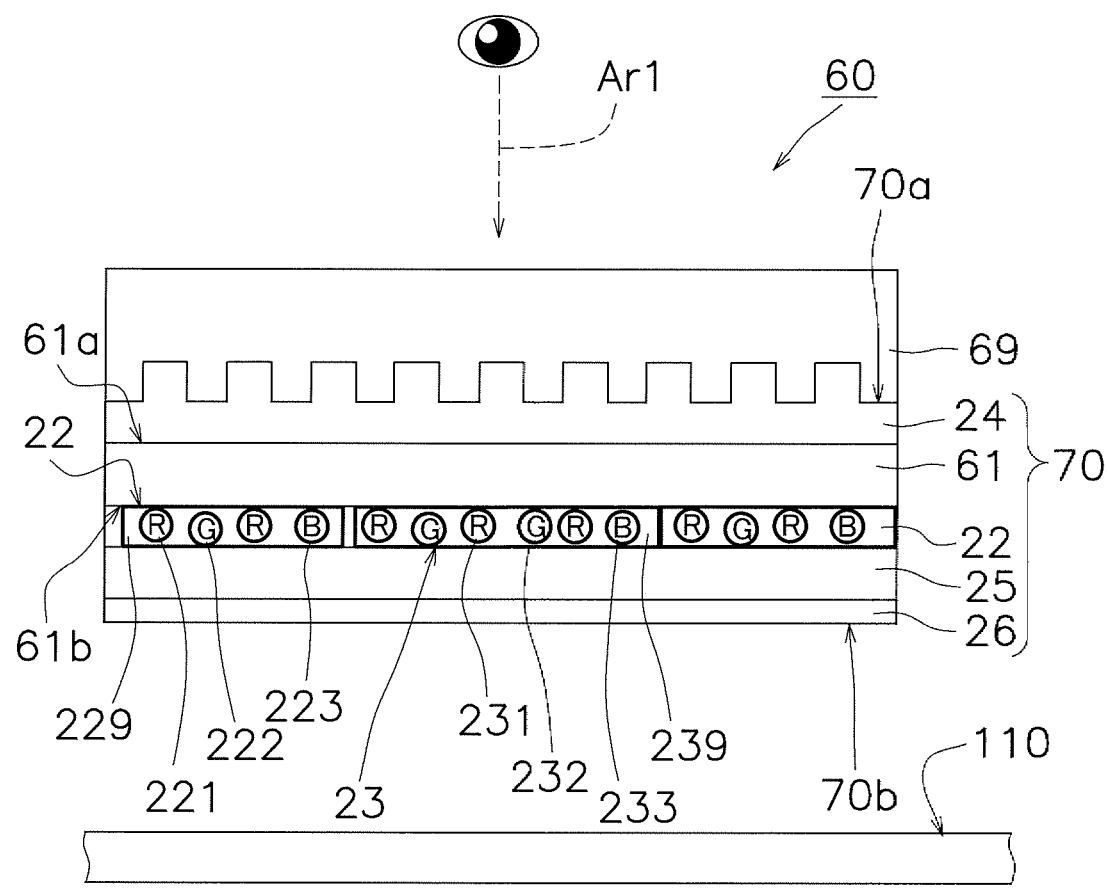
FIG. 15 is a schematic cross-sectional view illustrating an example of a configuration of a decorative sheet of a second embodiment.
Figure 16A:
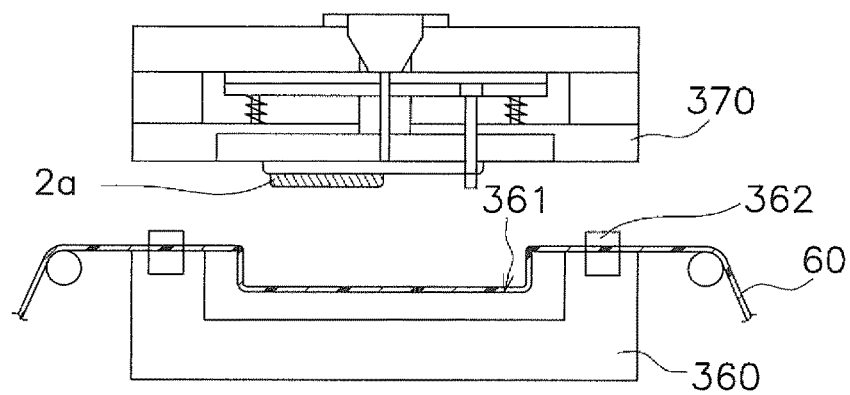
FIG. 16($a$) is a cross-sectional view illustrating an arrangement step of insert molding and simultaneous molding and decoration, FIG. 16($b$) is a cross-sectional view illustrating a clamping step, FIG. 16($c$) is a cross-sectional view illustrating an injection step, and FIG. 16($d$) is a cross-sectional view illustrating an opening step.
Figure 16B:
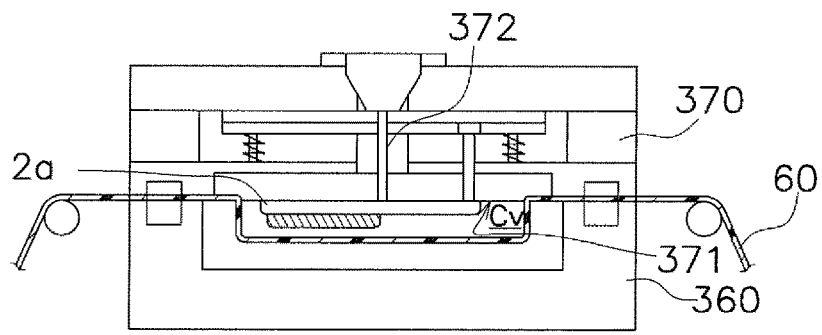
Figure 16C:
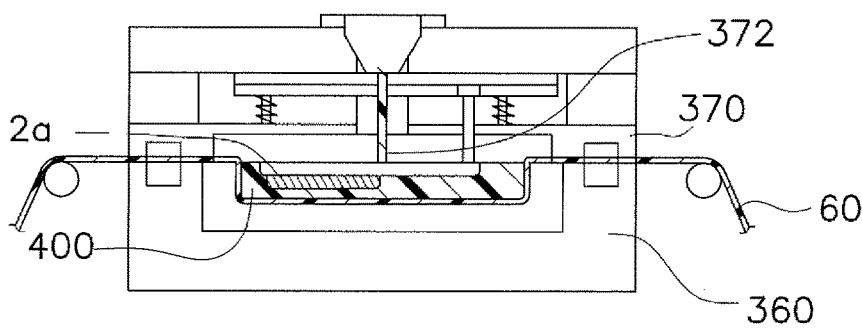
Figure 16D:
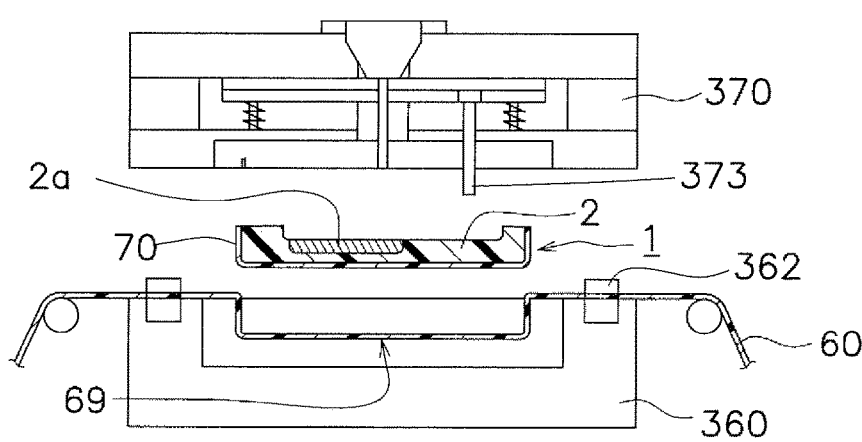

FIG. 15 schematically illustrates the cross-sectional structure of the decorative sheet 60. The decorative sheet 60 illustrated in FIG. 15 includes a base material film 69, a protective layer 61, the first graphic layer 22, the second graphic layer 23, the optical functional layer 24, the transmittance adjustment layer 25, and the adhesive layer 26. The protective layer 61, the first graphic layer 22, the second graphic layer 23, the optical functional layer 24, the transmittance adjustment layer 25, and the adhesive layer 26 among them constitute the transfer layer 70. The transfer layer 70 is a layer transferred to the molded body 2, and is a layer peeled from the base material film 69 after the transfer. Note that a peeling layer for facilitating peeling of the transfer layer 70 from the base material film 69 may be provided between the base material film 69 and the transfer layer 70.

The protective layer 61 is a layer that transmits visible light. Here, the case where the protective layer 61 is transparent will be described, but the protective layer 61 may be translucent. The protective layer 61 includes a first main surface 61a and a second main surface 61b. The transfer layer 70 faces the first main surface 61a of the protective layer 61 to outside the center console 1 as the molded article and faces the second main surface 61b inside the center console 1.

The first graphic layer 22 and the second graphic layer 23 of the decorative sheet 60 can be configured similarly to the first graphic layer 22 and the second graphic layer 23 of the decorative sheet 20 of the first embodiment, and thus descriptions of the first graphic layer 22 and the second graphic layer 23 of the decorative sheet 60 are omitted here.

The optical functional layer 24 is provided closer to a front surface 70a of the transfer layer 70 with respect to the protective layer 61. Note that the optical functional layer 24 may be provided to double as the protective layer 61. The layer that doubles as the optical functional layer 24 and the protective layer 61 can have, for example, a configuration same as a configuration of providing the optical functional layer 24 on the hard coat layer of the first embodiment. The optical functional layer 24 has an optical function that changes a reflectance property of light on the first main surface 61a of the protective layer 61. To describe the optical function in more detail, the optical functional layer 24 is configured to have the reflectance property that increases a ratio of at least one of an amount of visible light representing the graphic and an amount of visible light representing the image of the screen 110 to an amount of the visible light reflected by the front surface 70a of the transfer layer 70 and visually recognized by the user (the driver of the automobile) by changing the reflectance property of the first main surface 61a of the protective layer 61.

An effect that the optical functional layer 24 has the function of suppressing the reflection by the front surface 70a of the transfer layer 70 has an effect similar to the effect in the case where the optical functional layer 24 has the function of suppressing the reflection by the front surface 20a of the decorative sheet 20, which has been described with reference to FIG. 6 to FIG. 9. Describing the effect of the function of suppressing the reflection by the front surface 70a of the transfer layer 70 results in repetition of the contents similar to the description of the effect of the function of suppressing the reflection by the front surface 20a of the decorative sheet 20, and therefore the description of the function of suppressing the reflection of the optical functional layer 24 to the transfer layer 70 will be omitted.

An effect that the optical functional layer 24 has the function of diffusing the reflected light by the front surface 70a of the transfer layer 70 has an effect similar to the effect in the case where the optical functional layer 24 has the function of diffusing the reflected light at the front surface 20a of the decorative sheet 20, which has been described with reference to FIG. 10. Describing the effect of the function of diffusing the reflected light at the front surface 70a of the transfer layer 70 results in repetition of the contents similar to the description of the effect of the function of diffusing the reflection at the front surface 20a of the decorative sheet 20, and therefore the description of the function of diffusing the reflected light of the optical functional layer 24 to the transfer layer 70 will be omitted.

The transmittance adjustment layer 25 of the decorative sheet 60 can be configured similarly to the transmittance adjustment layer 25 of the decorative sheet 20 of the first embodiment, and thus description of the transmittance adjustment layer 25 of the decorative sheet 60 is omitted here.

(5) Method for Manufacturing Center Console 1

An example of the method for manufacturing the center console 1 as the molded article will be described with reference to FIG. 16(*a*) to FIG. 16(*d*). In a manufacturing process illustrated in FIG. 16(*a*), the decorative sheet 60 including the transfer layer 70 (see FIG. 15) is disposed on an inner surface 361 of a first mold 360. The decorative sheet 60 is fixed with clamps 362. A component 2a is disposed on a second mold 370. The component 2a is adsorbed and fixed to the second mold 370.

Next, a clamping step illustrated in FIG. 16(*b*) is performed. In the clamping step, the cavity Cv housing the decorative sheet 60 disposed on the first mold 360 and the component 2a disposed on an inner surface 371 of the second mold 370 is formed.

FIG. 16(*c*) illustrates an injection step. In the injection step, the molten material 400 is injected into the cavity Cv formed between the first mold 360 and the second mold 370 through a sprue 372. The molten material 400 is in close contact with respective surfaces the components 2a and the transfer layer 70 (see FIG. 16(*a*)) of the decorative sheet 60, and an adhesive layer (not illustrated) of the component 2a and the adhesive layer 26 (see FIG. 15) of the transfer layer 70 provide an adhesive function by heat and pressure directly transmitted from the molten material 400. When the cavity Cv is filled with the molten material 400 to stop the flow, the molten material 400 is cooled via the first mold 360 and the second mold 370. The molten material 400 is cooled and solidified to mold the molded body 2.

Next, as illustrated in FIG. 16(*d*), the first mold 360 and the second mold 370 are opened. At this time, the transfer layer 70 is peeled from the decorative sheet 60, the center console 1 as the molded article remains in the second mold 370, and the base material film 69 of the decorative sheet 60 remains in the first mold 360. For example, the center console 1 is removed from the second mold 370 using, for example, an ejector pin 373 protruding from the second mold 370, and is held and removed by an approaching extraction robot (not illustrated).

Heat and pressure are applied from the molten material 400 to the transfer layer 70 of the decorative sheet 60 during injection molding. However, since content ratios of the interference pigments 221 to 223 and 231 to 233 do not change by the heat or pressure, the first mixed color (for example, ocher) exhibited by the first graphic layer 22 of the transfer layer 70 or the second mixed color (for example, dark brown) exhibited by the second graphic layer 23 does not change.

(6) Modified Examples

(6-1) Modified Example A

The above-described decorative sheet 20 or transfer layer 70 may include an interference light noise cut layer provided closer to the front surface 20a of the decorative sheet 20 or the front surface 70a of the transfer layer 70 than the first graphic layer 22 and the second graphic layer 23. The interference light noise cut layer may contain interference light noise cut ink that reduces noise of the interference light emitted from the first graphic layer 22 and the second graphic layer 23. The interference light noise cut ink is ink that absorbs light at a wavelength other than the wavelength of the interference light. The interference light noise cut ink contains, for example, an absorption pigment. For example, when blue is desired to be more clearly developed, a trace amount of a blue absorption pigment is added in the interference light noise cut layer. Examples of the blue absorption pigment include a synthetic pigment, such as phthalocyanine blue. The decorative sheet or the transfer layer configured in this manner can reduce the noise increased by heat and pressure during injection molding in the interference light noise cut layer and suppress the change in graphic due to the injection molding.

(6-2) Modified Example B

In the first embodiment and the second embodiment described above, the case in which the mixed colors exhibited by the first graphic layer 22 and the second graphic layer 23 are formed only with the interference pigments 221 to 223 and 231 to 233 has been described. However, a pigment other than the interference pigments 221 to 223 or 231 to 233 may be added to the mixed colors exhibited by the first graphic layer 22 and the second graphic layer 23. For example, a silver pigment may be added to the first graphic layer 22 and the second graphic layer 23. Examples of the silver pigment include, for example, an aluminum flake.

(6-3) Modified Example C

Figure 17:
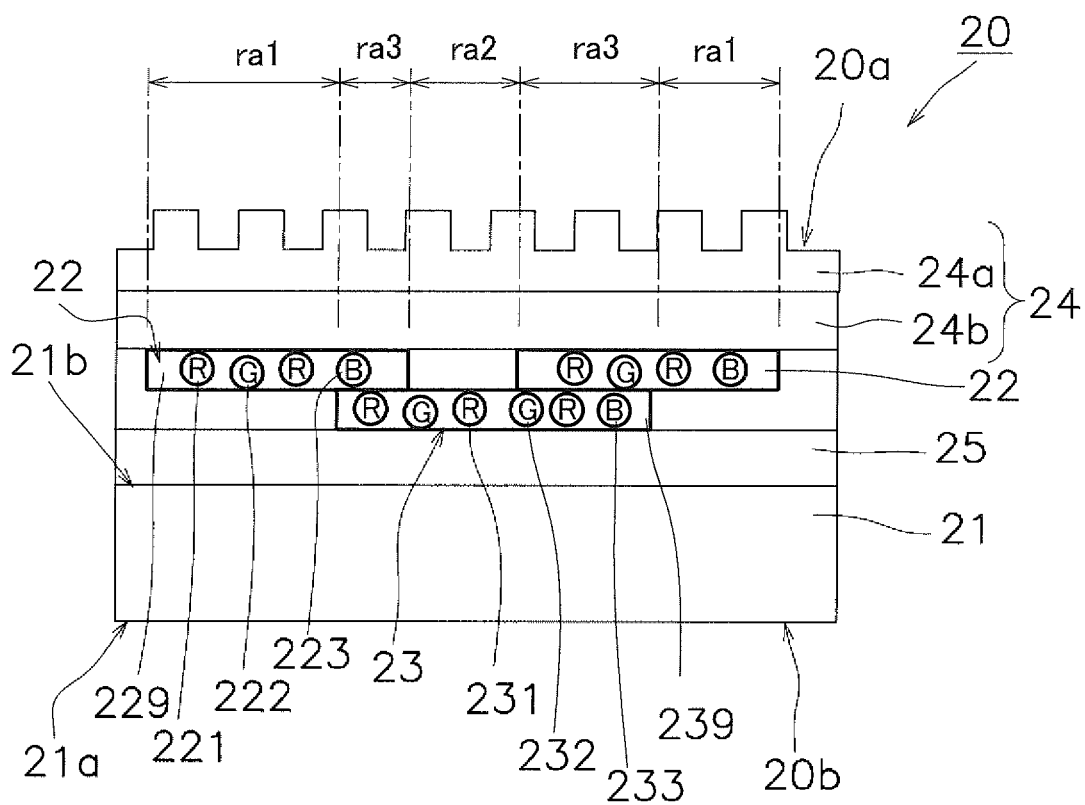
FIG. 17 is a schematic cross-sectional view illustrating a modified example of a configuration of a decorative sheet.

In the first embodiment described above, the case where the base film 21 is disposed closer to the front surface 20a of the decorative sheet 20 than the first graphic layer 22 and the second graphic layer 23 has been described. However, as illustrated in FIG. 17, the base film 21 may be disposed closer to the back surface 20b of the decorative sheet 20 than the first graphic layer 22 and the second graphic layer 23. In this case, the optical functional layer 24 is formed by including an optical function portion 24a that provides an optical function on a relatively thick protective layer portion 24b that transmits visible light. The protective layer portion 24b can be configured similarly to the hard coat layer described above, for example. A thickness of the protective layer portion 24b is, for example, from 0.1 μm to 1 μm.

(6-4) Modified Example D

In the first embodiment and the second embodiment described above, the case where the first graphic layer 22 does not overlap with the second graphic layer 23 has been described. However, as illustrated in FIG. 17, the first graphic layer 22 and the second graphic layer 23 may be disposed such that a portion of one of them overlaps with a portion or all of the other one.

In FIG. 17, a first range ra1 is a range where the interference light is emitted from the first graphic layer 22, a second range ra2 is a range where the interference light is emitted from the second graphic layer 23, and a third range ra3 is a range where the interference light is emitted from both the first graphic layer 22 and the second graphic layer 23. The first range ra1 is seen to have the first mixed color exhibited by the first graphic layer 22. The second range ra2 is seen to have the second mixed color exhibited by the second graphic layer 23. The third range ra3 is seen to have a third mixed color produced by additive color mixing of the first mixed color by the first graphic layer 22 and the second mixed color by the second graphic layer 23. Among three colors of the first mixed color in the first range ra1, the second mixed color in the second range ra2, and the third mixed color in the third range ra3, the third mixed color is the brightest color. The third mixed color becomes a color closer to white than the first mixed color and the second mixed color.

(6-5) Modified Example E

In the first embodiment and the second embodiment described above, the case in which the optical functional layer 24 having the optical function of diffusing the reflected light is achieved with unevenness has been described. However, the optical functional layer 24 having such a function may be achieved by dispersing, for example, particles for diffusing reflected light into the optical functional layer 24, and is not limited to have the configurations of the optical functional layers 24 of the above-described embodiments.

(6-6) Modified Example F

In the first embodiment and the second embodiment described above, the case in which one optical functional layer 24 has one of the optical function that diffuses the reflected light and the optical function that increases the amount of transmitted light and reduces the amount of reflected light has been described. However, one optical functional layer 24 may double as both of the two optical functions described above. To obtain the optical functional layer 24 that doubles as both of the two optical functions described above, for example, it is only necessary that, after forming a hard coat layer with unevenness, an anti-reflection film may be formed on a surface of the hard coat layer with unevenness. Note that the anti-reflection film can also be referred to as an anti-glare layer.

(6-7) Modified Example G

In the first embodiment and the second embodiment described above, the case in which the display on the screen 110 of the display device 100 is projected with the transmitted light that passes through from the side of a back surface 20b or 70b of the decorative sheet 20 or the transfer layer 70 to the side of the front surface 20a or 70a has been described. However, the screen 110 and one other than the screen 110 may be displayed with the transmitted light.

Figure 18:
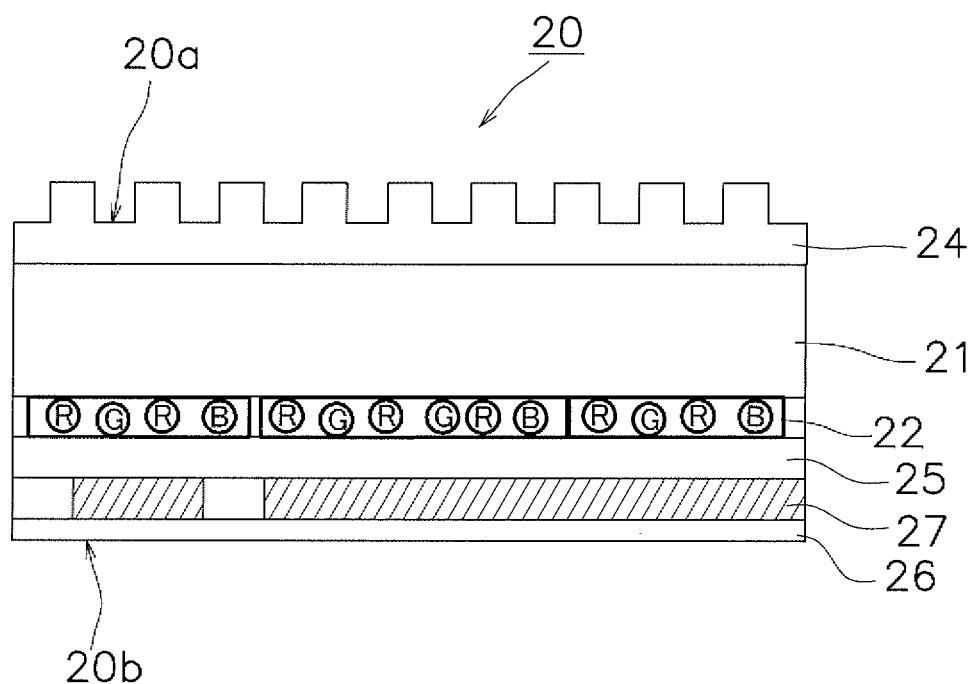
FIG. 18 is a schematic cross-sectional view illustrating an example of a configuration of a decorative sheet according to Modified Example G.

A modified example G will be described with reference to FIG. 18, FIG. 19, and FIG. 20. In comparison with the decorative sheet 20 of the first embodiment, the decorative sheet 20 according to Modified Example G differs in that a mask layer 27 is further provided. The mask layer 27 is a layer for blocking transmitted light at a predetermined location. The mask layer 27 has a transmittance of light at the predetermined location even smaller than that of the transmittance adjustment layer 25. The mask layer 27 is disposed closer to the back surface 20b of the decorative sheet 20 than the first graphic layer 22 and the second graphic layer 23. Note that in the decorative sheet 20 illustrated in FIG. 18, the mask layer 27 is disposed closer to the back surface 20b than the transmittance adjustment layer 25, but the mask layer 27 may be disposed closer to the front surface 20a than the transmittance adjustment layer 25.

Figure 20:
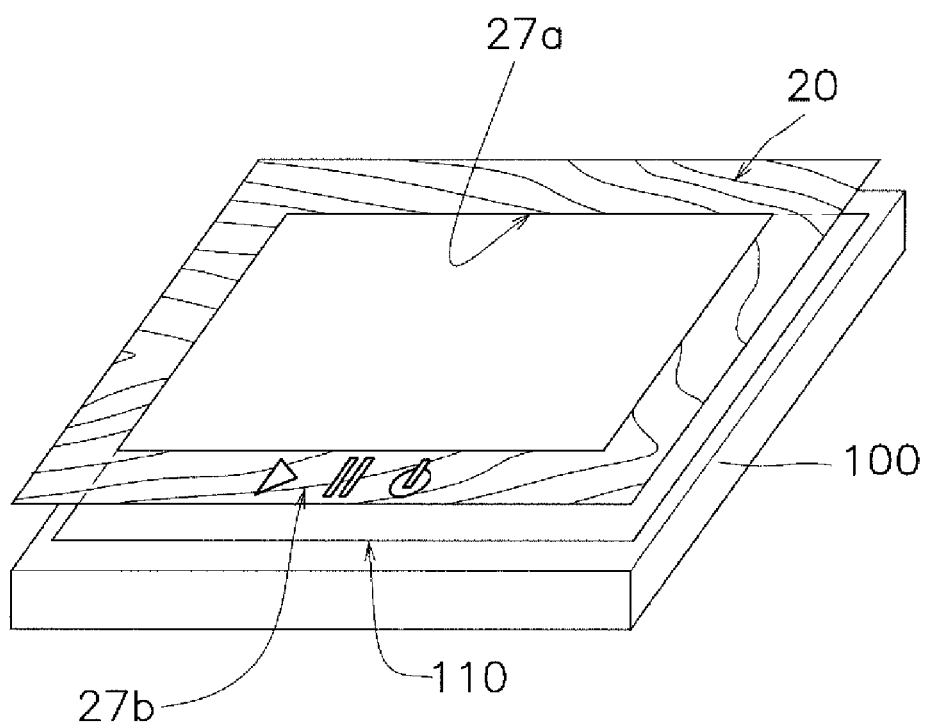
FIG. 20 is a schematic perspective view for describing display by transmitted light of the display device according to Modified Example G.

As illustrated in FIG. 20, the mask layer 27 includes an opening 27a corresponding to the screen 110 of the display device 100 and an icon portion 27b. The opening 27a and the icon portion 27b are transparent portions that transmit light.

For example, a light-transmitting touch sensor (not illustrated) is stacked and disposed on the decorative sheet 20. Touching the icon portion 27b allows an operation of the displayed icon using the touch sensor.

Figure 19:
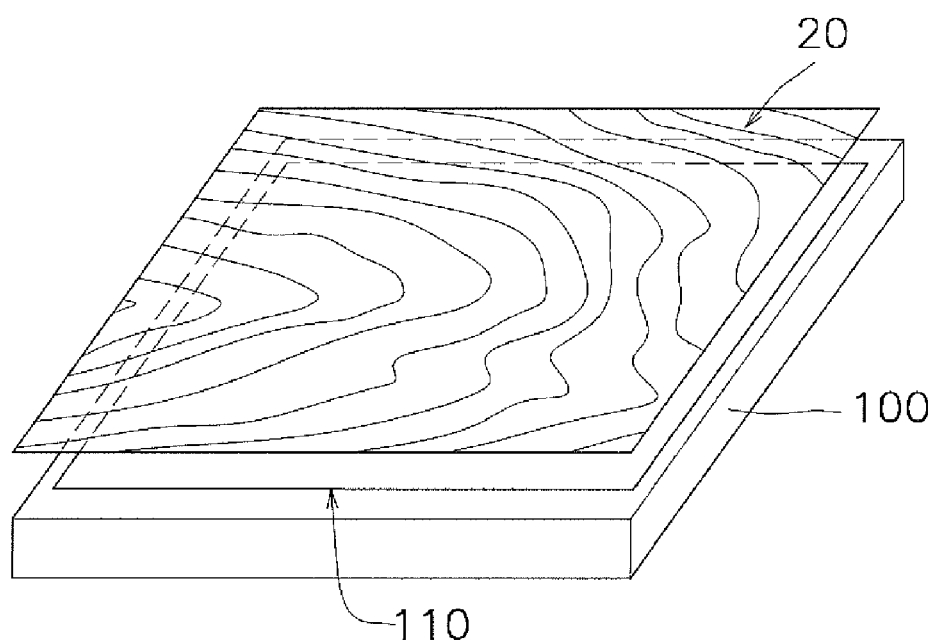
FIG. 19 is a schematic perspective view for describing decoration by reflected light of a display device according to Modified Example G.

When light is not irradiated from the screen 110 of the display device 100, as illustrated in FIG. 19, the user (the driver of the automobile) visually recognizes a grain pattern of the decorative sheet 20.

When light is irradiated from the entire screen 110 of the display device 100, as illustrated in FIG. 20, the grain pattern, the display of the opening 27a, and the icon portion 27b are visually recognized. A region in which the grain pattern is visually recognized in this case is a region excluding the opening 27a or the icon portion 27b in the mask layer 27. The icon portion 27b includes a triangle icon, a double-line icon, and an icon having a shape combining a circle and a straight line.

In the icon portion 27b, the display on the screen 110 allows transmitting information related to the icon. For example, it is configured that when the triangle icon of the icon portion 27b is touched, a music player (not illustrated) is in a playback state by the touch sensor, and when the triangle icon portion 27b is further touched, the music player stops. When the position corresponding to the triangle icon portion 27b of the screen 110 is lit in green or red, the driver of the automobile sees the lit green triangle in the grain pattern. For example, the driver can recognize that the music player is in the stopped state by the green triangle icon. To play the music player, the driver only needs to touch the green triangle icon. When the music player is in the playback state, it is only necessary to, for example, lit the triangle icon in red using the screen 110.

In this way, not only the display of the screen 110, information desired to be delivered can be expressed also using the decorative sheet 20. Here, the case has in which the icon portion 27b is lit using the screen 110 has been described the, but the icon portion 27b may be lit using light emitting means other than the screen 110, such as a light-emitting diode (LED).

Note that the mask layer 27 is provided in the transfer layer 70, and the function same as that of the mask layer 27 of the decorative sheet 20 described above can be provided to the transfer layer 70.

(6-8) Modified Example H

In the first embodiment and the second embodiment described above, the case where the two graphic layers of the first graphic layer 22 and the second graphic layer 23 are used has been described. However, the graphic layers that can be used are not limited to two, and three or more graphic layers may be used. For example, to improve a quality of the graphic, such as multicolor sensation and depth of expression of the graphic, a third graphic layer exhibiting a third mixed color different from the first graphic layer 22 and the second graphic layer 23 may be added.

(7) Features 7-1

In the first graphic layer 22 of the decorative sheet 20 or 60, the plurality of color interference pigments 221 to 223 are mixed. The ratios and the positional relationships of the mutual interference pigments 221 to 223 are fixed with the first binder 229. Therefore, during simultaneous molding and decoration using the decorative sheet 20 or 60, even when the decorative sheet 20 and the transfer layer 70 of the decorative sheet 60 receive the heat and the pressure from the molten material 400 for forming the molded body 2, changes in these ratios and positional relationships are suppressed.

Figure 21:
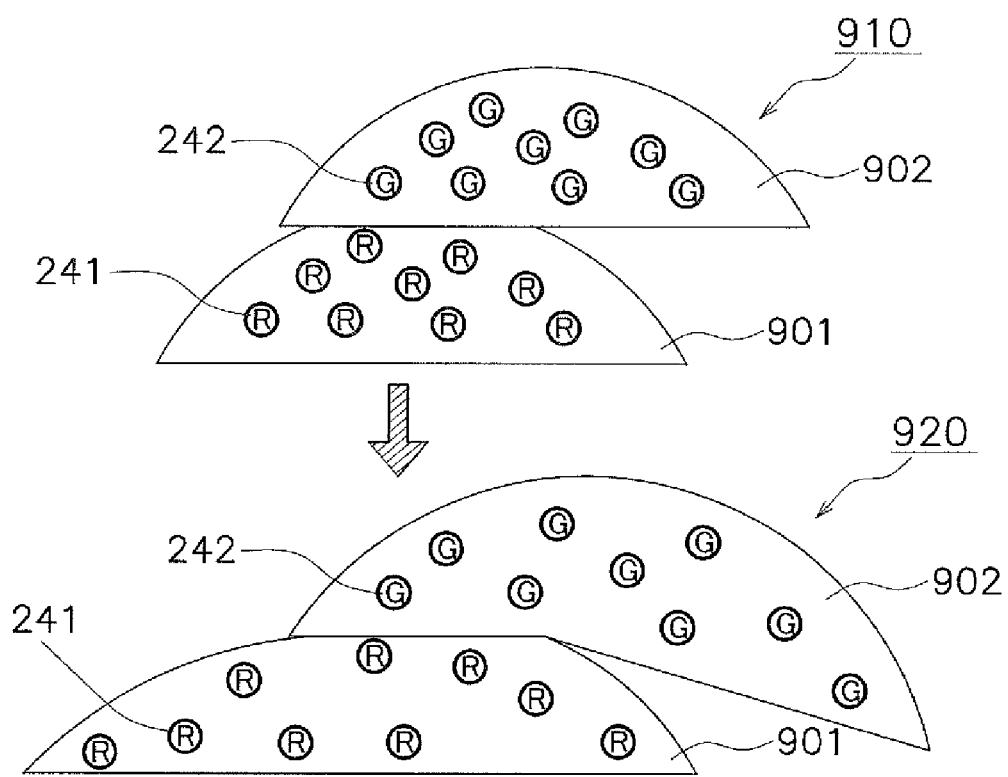
FIG. 21 is a schematic view for describing a change in color due to heat and pressure during injection molding.

For example, as illustrated in FIG. 21, a case where red interference pigments 241 are dotted and fixed in one binder 901 and green interference pigments 242 are dotted and fixed in another binder 902 to constitute one pixel 910 is considered. In such a case, due to the heat and pressure during injection molding, when one of the dotted binders 901 and 902 is displaced like a pixel 920, changes in an area where red or green is generated and the amount of light change the color of the pixel 910. Such a color change is less likely to occur in the ocher (the first mixed color) and the dark brown (the second mixed color) of the first graphic layer 22 and the second graphic layer 23.

7-2

As described with reference to FIG. 6 and FIG. 7, when the amount of transmitted light of the first main surface 21a of the base film 21 is increased and the amount of reflected light is reduced by the optical functional layer 24, the quality of the graphic represented by the first graphic layer 22 and the second graphic layer 23 can be improved. Since the amount of light that reaches the interference pigments 221 to 223 of the first graphic layer 22 and the interference pigments 231 to 233 of the second graphic layer 23 increase, this effect is obtained. In this manner, in the case where the interference pigments 221 to 223 having the plurality of colors are contained in one first binder 229 and the interference pigments 231 to 233 having the plurality of colors are contained in one second binder 239, the effect of improving the color development increases due to an increase in the amount of light.

As described with reference to FIG. 8 and FIG. 9, the light for displaying the image by the display device 100 is partially reflected by the first main surface 21a of the base film 21 in the case of the optical functional layer 24 being absent. When the interference light is emitted from the interference pigments 221 to 223 and 231 to 233 caused by such a reflected light, the interference light becomes noise for the image of the display device 100. With the optical functional layer 24 that increases the amount of transmitted light and reduces the amount of reflected light in the first main surface 21a, the light for displaying the image being reflected by the first main surface 21a of the base film 21 can be suppressed. As a result, unnecessary interference light can be reduced to reduce noise in the image, and the image can be easily seen.

As described with reference to FIG. 8 and FIG. 10, the light for displaying the image by the display device 100 is partially reflected by the first main surface 21a of the base film 21 in the case of the optical functional layer 24 being absent.

With the optical functional layer 24 that diffuses the reflected light by the first main surface 21a, the light for displaying the image is reflected by the first main surface 21a of the base film 21 and a large amount of light being locally given to the interference pigments 221 to 223 and 231 to 233 can be suppressed. As a result, unnecessary interference light can be weakened to reduce noise in the image, and the image can be easily seen.

7-4

When the transmittance adjustment layer 25 is provided, the amount of visible light passing through the front surface 20a from the back surface 20b of the decorative sheet 20 or the amount of visible light passing through the front surface 70a from the back surface 70b of the transfer layer 70 can be adjusted to be an appropriate amount. As a result, the light for displaying the image can pass through the transmittance adjustment layer 25, and visibility of the image displayed on the display device 100 can be ensured.

Additionally, when the display device 100 does not display the image, a figure of the device for displaying the image present on the side of the back surface 20b of the decorative sheet 20 or the side of the back surface 70b of the transfer layer 70 can be sufficiently hidden.

7-5

The optical functional layer 24 is preferably formed as a hard coat layer having a hardness higher than that of the base film 21. The first graphic layer 22 and the second graphic layer 23 are disposed closer to the back surface 20b of the decorative sheet 20 than the optical functional layer 24. As a result, the first graphic layer 22 and the second graphic layer 23 are less likely to be fouled by the optical functional layer 24 having the high hardness, making it possible to maintain a beautiful graphic over a long time.

Although the embodiments and the modifications of the present invention have been described above, the present invention is not limited to the above-described embodiments and modifications, and various changes are possible without departing from the gist of the invention. In particular, the plurality of embodiments and modified examples described herein can be combined arbitrarily with one another as necessary.

REFERENCE CHARACTER LIST

1: Center console (an example of a molded article)
2: Molded body
20, 60: Decorative sheet
21: Base film
22: First graphic layer
23: Second graphic layer
24: Optical functional layer
25: Transmittance adjustment layer
70: Transfer layer
110: Screen
221 to 223, 231 to 233: Interference pigment
229: First binder
239: Second binder

The invention claimed is:

1. A decorative sheet having a back surface and a front surface used to decorate a molded article including a light-transmissive molded body having a three-dimensional shape or a two-dimensional shape, the back surface being bonded to the molded body, the front surface facing a side opposite to the molded body, the decorative sheet comprising:
   a base film having a first main surface and a second main surface and transmitting visible light;
   a first graphic layer provided on a side of the second main surface of the base film, the first graphic layer containing a plurality of kinds of interference pigments in a first group that emit respective interference lights having a plurality of colors different from one another in a first direction heading from the back surface to the front surface in a first binder that transmits visible light to exhibit a first mixed color;
   a second graphic layer provided on a side of the second main surface of the base film, the second graphic layer containing a plurality of kinds of interference pigments in a second group that emit respective interference lights having a plurality of colors different from one another in the first direction in a second binder that transmits visible light to exhibit a second mixed color different from the first mixed color;
   an optical functional layer provided closer to the front surface than the first graphic layer and the second graphic layer, the optical functional layer having an optical function that changes a reflectance property of light and transmits visible light; and
   an adhesive layer provided on the back surface, the adhesive layer transmitting visible light and being bondable to the molded body, wherein
   the first graphic layer and the second graphic layer are configured such that a first planer shape of the first graphic layer and a second planer shape of the second graphic layer are combined to represent a graphic visually recognizable from a side of the front surface and the interference pigments in the first group, the interference pigments in the second group, the first binder, and the second binder transmit incident light traveling in the first direction to allow visually recognizing an image displayed on a side of the back surface from the side of the front surface, and
   the optical functional layer is configured to have a reflectance property, and the reflectance property increases a ratio of at least one of an amount of visible light representing the graphic and an amount of visible light representing the image and passing through the first graphic layer and the second graphic layer with respect to an amount of visible light reflected by the front surface and visually recognized.

2. The decorative sheet according to claim 1, wherein the optical functional layer has a hardness higher than a hardness of the base film.

3. A decorative sheet having a back surface and a front surface, comprising:
- a transfer layer transferred with the back surface bonded to a molded body and the front surface facing a side opposite to the molded body to decorate a molded article including the light-transmissive molded body having a three-dimensional shape or a two-dimensional shape; and
- a base material sheet that supports the transfer layer to be peelable, wherein
the transfer layer includes:
  - a protective layer having a first main surface and a second main surface and transmitting visible light;
  - a first graphic layer provided on a side of the second main surface of the protective layer, the first graphic layer containing a plurality of kinds of interference pigments in a first group that emit respective interference lights having a plurality of colors different from one another in a first direction heading from the back surface to the front surface in a first binder that transmits visible light to exhibit a first mixed color;
  - a second graphic layer provided on a side of the second main surface of the protective layer, the second graphic layer containing a plurality of kinds of interference pigments in a second group that emit respective interference lights having a plurality of colors different from one another in the first direction in a second binder that transmits visible light to exhibit a second mixed color different from the first mixed color;
  - an optical functional layer provided closer to the front surface than the first graphic layer and the second graphic layer, the optical functional layer having an optical function that changes a reflectance property of light and transmits visible light; and
  - an adhesive layer provided on the back surface, the adhesive layer transmitting visible light and being bondable to the molded body,
the first graphic layer and the second graphic layer are configured such that a first planer shape of the first graphic layer and a second planer shape of the second graphic layer are combined to represent a graphic visually recognizable from a side of the front surface and the interference pigments in the first group, the interference pigments in the second group, the first binder, and the second binder transmit incident light traveling in the first direction to allow visually recognizing an image displayed on a side of the back surface from the side of the front surface, and
the optical functional layer is configured to have a reflectance property, and the reflectance property increases a ratio of at least one of an amount of visible light representing the graphic and an amount of visible light representing the image and passing through the first graphic layer and the second graphic layer with respect to an amount of visible light reflected by the front surface and visually recognized.

4. The decorative sheet according to claim 1, wherein the optical functional layer has an optical function that increases an amount of transmitted light and reduces an amount of reflected light in the front surface.

5. The decorative sheet according to claim 1, wherein the optical functional layer has an optical function that diffuses reflected light.

6. The decorative sheet according to claim 1, comprising a transmittance adjustment layer provided closer to the back surface than the first graphic layer and the second graphic layer to adjust a transmittance.

7. A method for manufacturing a molded article, comprising:
- setting a decorative sheet into a cavity of a mold; and
- injecting a molten material in the mold to mold a transmissive molded body and fixedly securing the decorative sheet to the molded body simultaneously, wherein
the decorative sheet includes:
  - a base film having a first main surface and a second main surface and transmitting visible light;
  - a first graphic layer provided on a side of the second main surface of the base film, the first graphic layer containing a plurality of kinds of interference pigments in a first group that emit respective interference lights having a plurality of colors different from one another in a first direction heading from a back surface of the decorative sheet to a front surface of the decorative sheet in a first binder that transmits visible light to exhibit a first mixed color;
  - a second graphic layer provided on a side of the second main surface of the base film, the second graphic layer containing a plurality of kinds of interference pigments in a second group that emit respective interference lights having a plurality of colors different from one another in the first direction in a second binder that transmits visible light to exhibit a second mixed color different from the first mixed color;
  - an optical functional layer provided closer to the first main surface than the first graphic layer and the second graphic layer, the optical functional layer having an optical function that changes a reflectance property of light and transmits visible light; and
  - an adhesive layer provided on the back surface, the adhesive layer transmitting visible light and being bondable to the molded body,
the first graphic layer and the second graphic layer are configured such that a first planer shape of the first graphic layer and a second planer shape of the second graphic layer are combined to represent a graphic visually recognizable from a side of the front surface and the interference pigments in the first group, the interference pigments in the second group, the first binder, and the second binder transmit incident light traveling in the first direction to allow visually recognizing an image displayed on a side of the back surface from the side of the front surface, and
the optical functional layer is configured to have a reflectance property, and the reflectance property increases a ratio of at least one of an amount of visible light representing the graphic and an amount of visible light representing the image and passing through the first graphic layer and the second graphic layer with respect to an amount of visible light reflected by the front surface and visually recognized.

* * * * *